United States Patent
Abraham et al.

(10) Patent No.: US 8,971,247 B2
(45) Date of Patent: Mar. 3, 2015

(54) METHODS, DEVICES, AND SYSTEMS FOR EFFICIENT RETRANSMISSION COMMUNICATIONS

(75) Inventors: Santosh Paul Abraham, San Diego, CA (US); Zhi Quan, Livermore, CA (US); Simone Merlin, Solana Beach, CA (US); Mohammad H. Taghavi Nasrabadi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 193 days.

(21) Appl. No.: 13/481,107

(22) Filed: May 25, 2012

(65) Prior Publication Data

US 2013/0315139 A1    Nov. 28, 2013

(51) Int. Cl.
*H04W 4/00*       (2009.01)
*H04L 1/18*       (2006.01)
*H04L 1/16*       (2006.01)
*H04L 12/807*     (2013.01)
*H04B 7/04*       (2006.01)
(Continued)

(52) U.S. Cl.
CPC ............... *H04L 1/18* (2013.01); *H04L 1/1621* (2013.01); *H04L 1/1635* (2013.01); *H04L 47/27* (2013.01); *H04B 7/0452* (2013.01); *H04L 12/189* (2013.01); *H04W 84/12* (2013.01)
USPC ........................................................ 370/328

(58) Field of Classification Search
CPC ............................. H04L 1/1832; H04L 1/187
USPC ......................................................... 370/328
See application file for complete search history.

(56) References Cited

U.S. PATENT DOCUMENTS

| 7,743,310 | B2   | 6/2010 | Nishibayashi et al. |
| 2006/0146705 | A1* | 7/2006 | Waxman ........................ 370/230 |
| 2009/0196364 | A1* | 8/2009 | Nakajima et al. ............. 375/260 |

(Continued)

OTHER PUBLICATIONS

Charfi, E., et al., "Analytical analysis of applying aggregation with fragment retransmission on IEEE 802.11e EDCA network in saturated conditions", Communications and Networking (COMNET), 2012 Third International Conference on, IEEE, Mar. 29, 2012, pp. 1-9, XP032186083, DOI: 10.1109/COMNET.2012.6217730, ISBN: 978-1-4673-1007-9, Sections II.C and III.

(Continued)

*Primary Examiner* — Michael Thier
*Assistant Examiner* — Yaotang Wang
(74) *Attorney, Agent, or Firm* — Bay Area Technology Law Group PC

(57) ABSTRACT

Methods, devices, and systems for retransmitting Media Access Control (MAC) protocol data units (MPDUs) in a multi-user multiple-input and multiple-output (MU-MIMO) communication system are disclosed. Concurrent data streams within a first transmission window are transmitted. Each concurrent data stream is associated with a different recipient and includes an equal number of MPDUs. An indication of a retransmission subset of the MPDUs to be retransmitted for each concurrent data stream may be obtained if errors are present. The retransmission subset for each concurrent data stream is retransmitted within a second transmission window. A length of the second transmission window is as long as the longest of the retransmission subsets of the concurrent data streams. One or more new MPDUs may be added to the concurrent data streams in the second transmission window so that each concurrent data stream in the second transmission window carries a same number of MPDUs.

41 Claims, 12 Drawing Sheets

(51) Int. Cl.
*H04L 12/18* (2006.01)
*H04W 84/12* (2009.01)

(56) References Cited

U.S. PATENT DOCUMENTS

| | | |
|---|---|---|
| 2009/0279631 A1 | 11/2009 | Chen et al. |
| 2009/0319852 A1* | 12/2009 | Nabetani ................. 714/749 |
| 2009/0327828 A1 | 12/2009 | Ojala et al. |
| 2010/0046540 A1* | 2/2010 | Nishibayashi et al. ....... 370/445 |
| 2010/0100787 A1* | 4/2010 | Zhang et al. ................. 714/748 |
| 2010/0189056 A1* | 7/2010 | Nishibayashi et al. ....... 370/329 |
| 2011/0128973 A1 | 6/2011 | Yonge, III et al. |
| 2011/0161768 A1 | 6/2011 | Chang et al. |
| 2011/0216728 A1* | 9/2011 | Nagata et al. ................. 370/329 |
| 2011/0305176 A1 | 12/2011 | Wentink |
| 2012/0117446 A1* | 5/2012 | Taghavi Nasrabadi et al. ............................ 714/776 |
| 2013/0176939 A1* | 7/2013 | Trainin et al. ................. 370/328 |

OTHER PUBLICATIONS

International Search Report and Written Opinion—PCT/US2013/042175—ISA/EPO—Aug. 8, 2013.

Zhu C., et al., "MAC enhancements for downlink multi-user MIMO transmission in next generation WLAN", Consumer Communications and Networking Conference (CCNC), 2012 IEEE, IEEE, Jan. 14, 2012, pp. 832-837, XP032161038, DOI: 10.1109/CCNC.2012.6181174, ISBN: 978-1-4577-2070-3.

* cited by examiner

METHODS, DEVICES, AND SYSTEMS FOR EFFICIENT RETRANSMISSION COMMUNICATIONS

BACKGROUND

1. Field

One feature generally relates to wireless communications, and more particularly, to methods and devices that retransmit information due to reception of erroneous information.

2. Background

The increased availability of Wireless Local Area Networks (WLANs) has allowed stations, such as desktop computers, laptop computers, hand held personal digital assistants (PDAs), and mobile phones, to wirelessly connect with one another through a variety of networks, such as Local Area Networks (LANs) and the Internet, to transfer data between them. For example, a user can take a laptop computer from a desk into a conference room to attend a meeting and still have access to a local network to retrieve data and have access to the Internet via one or more modems or gateways present on the local network without being tethered by a wired connection.

A WLAN may be comprised of four primary components. These components may include stations (STAs), one or more access points (APs), a wireless medium and a distribution system. The network is built to transfer data between stations that may include computing devices with wireless network interfaces. For example, laptop computers, desktop computers, mobile phones, and other electronic devices having wireless network interfaces are examples of stations within a network. Access points are devices that allow stations to connect to one another and transfer data. Examples of access points include routers, centralized controllers, base stations, and site controllers.

Data is transmitted over a WLAN via packets. Packets contain control information and payload information (e.g., the data); the form of packets vary depending on the communication protocol. A station may desire to transfer multimedia content, such as video, over the WLAN to another station via one or more access points.

In wireless (radio) communications, Multiple-Input and Multiple-Output (MIMO) offers significant increases in data throughput with little to no additional bandwidth or transmit power. This is achieved this by higher spectral efficiency (i.e., more bits per second per hertz of bandwidth) and link reliability or diversity (e.g., reduced fading). Multi-User (MU)-MIMO permits a network device (access node) to communicate with multiple client stations at each transmission window, by sending packets to multiple receivers over different channels during a particular transmission window.

The Institute of Electrical Engineers (IEEE) 802.11 standard denotes a set of Wireless Local Area Network (WLAN) air interface standards developed by the IEEE 802.11 committee for short-range communications (e.g., tens of meters to a few hundred meters). In conventional IEEE 802.11 communications, a Media Access Control (MAC) Protocol Data Unit (MPDU) may be used to exchange messages/data between entities at the MAC layer of a protocol stack via a packet-switched network. One or more MPDUs may be encapsulated within a PHY Protocol Data Unit (PPDU) that is transmitted at the PHY layer of a protocol stack. For instance, the maximum number of MPDUs per PPDU may be eight (8). During transmission, some MPDU packets may be lost or corrupted. Consequently, a transmission scheme is implemented to resend lost MPDU packets. However, in MIMO communications, the retransmission scheme can lead to inefficiencies beyond just retransmitting an erroneous packet.

Therefore, there is a need for improved efficiency in MIMO communications that include retransmission protocols.

SUMMARY

Embodiments of the present disclosure include devices, methods, and computer readable medium for improved efficiency in MIMO communications that include retransmission protocols.

A first method operational at a transmitter device is provided for retransmitting Media Access Control (MAC) protocol data units (MPDUs) in a multi-user multiple-input and multiple-output (MU-MIMO) communication system. A plurality of concurrent data streams are transmitted within a first transmission window, each concurrent data stream including one or more MPDUs and associated with a different recipient, the first transmission window having a first length. The MPDUs for each concurrent data stream may be encapsulated within a Physical (PHY) protocol data unit (PPDU). An indication of a retransmission subset of the MPDUs to be retransmitted for each concurrent data stream may then be obtained or received. Consequently, the retransmission subset is transmitted for each concurrent data stream within a second transmission window, wherein a length of the second transmission window is equal to a longest of the retransmission subsets of the concurrent data streams. In one example, the length of the second transmission window may be equal to or less than the first length of the first transmission window. In another example, each of the concurrent data streams in the first transmission window carries a first PPDU of the first length and each of the concurrent data streams in the second transmission window carries a second PPDU of a second length, where the second length is less than the first length.

In one example, an acknowledgment may be received for each MPDU in the first transmission window that is successfully received. The indication of the subset of the MPDUs to be retransmitted for each concurrent data stream may be obtained from a lack of acknowledgments received for the subset of MPDUs.

According to one feature, an error correcting code may be generated for the MPDUs in at least one data stream of the concurrent data streams of the first transmission window. The error correcting codes may be appended to the MPDUs in the at least one data stream of the concurrent data streams.

In one implementation, no new MPDUs are added to the concurrent data streams in the second transmission window thereby making the length of the second retransmission window less than the first length.

In another implementation, one or more new MPDUs may be added to the concurrent data streams in the second transmission window so that each concurrent data stream in the second transmission window have the same duration. The first transmission window may carry a first Physical (PHY) protocol data unit (PPDU) in a first data stream, the first PPDU having MPDUs with a maximum packet index, the second transmission window carries a second PPDU in the first data stream, and any new MPDUs added to the second PPDU has a packet index exceeding the maximum packet index.

In accordance with one aspect, at least a first data stream in the concurrent data streams may have MPDUs of a first duration and a second data stream in the concurrent data streams has MPDUs of a second duration. In accordance with another aspect, at least two data streams in the concurrent data streams have different data rates.

Similarly, a transmitter device may be provided for retransmitting Media Access Control (MAC) protocol data units (MPDUs) in a multi-user multiple-input and multiple-output (MU-MIMO) communication system. The transmitter device may include a communication interface coupled to a processing circuit. The communication interface may serve to communicate with a plurality of receiver devices. The processing circuit may be configured assemble for transmission a plurality of concurrent data streams within a first transmission window, each concurrent data stream including one or more MPDUs and associated with a different receiver device, the first transmission window having a first length. The processing circuit may receive, from the plurality of receiver devices, an indication of a retransmission subset of the MPDUs to be retransmitted for each concurrent data stream. Consequently, the processing circuit may assemble for transmission the retransmission subset for each concurrent data stream within a second transmission window, wherein a length of the second transmission window is equal to a longest of the retransmission subsets of the concurrent data streams. The processing circuit may be further configured to encapsulate each concurrent data stream within a Physical (PHY) protocol data unit, each of the concurrent data streams in the first transmission window carries a first PPDU of the first length and each of the concurrent data streams in the second transmission window carries a second PPDU of a second length, where the second length is less than the first length.

A second method operational in a transmitter is provided for retransmitting Media Access Control (MAC) protocol data units (MPDUs) in a multi-user multiple-input and multiple-output (MU-MIMO) communication system. A plurality of concurrent data streams are transmitted within a first transmission window, each concurrent data stream including one or more MPDUs and is associated with a different recipient, the first transmission window having a first length. As a result, indication of a retransmission subset of the MPDUs to be retransmitted may be received or obtained for at least one of the concurrent data streams. The plurality of concurrent data streams are then transmitted within a second transmission window, the at least one of the concurrent data streams in the second transmission window including the retransmission subset of the MPDUs and one or more new MPDUs so that a total length of each of the plurality of concurrent data streams in the second transmission window is equal to the first length. An indication may then be obtained or received that at least one packet of at least one of the retransmission subsets includes an error from transmitting the second plurality of concurrent data streams within the second transmission window indicating a need to retransmit at least one MPDU again. Consequently, the plurality of concurrent data streams may be retransmitted within a third transmission window, at least one concurrent data stream in the third transmission window including the at least one MPDU and one or more new MPDUs so that a total length of each of the plurality of concurrent data streams in the third transmission window is equal to the first length. At least a first data stream in the plurality of concurrent data streams may have MPDUs of a first duration and a second data stream in the plurality of concurrent data streams has MPDUs of a second duration, and the first length is a first time duration. The MPDUs for each concurrent data stream may be encapsulated within a Physical (PHY) protocol data unit (PPDU). At least two data streams in the concurrent data streams may have different data rates.

In accordance with one implementation, one or more new MPDUs may be added to the concurrent data streams in the second transmission window so that each concurrent data stream in the second transmission window have the same total duration. The first transmission window may carry a first Physical (PHY) protocol data unit (PPDU) in a first data stream, the first PPDU having MPDUs with a maximum packet index, the second transmission window carries a second PPDU in the first data stream, and any new MPDUs added to the second PPDU has a packet index exceeding the maximum packet index.

Similarly, a transmitter device may be provided for retransmitting Media Access Control (MAC) protocol data units (MPDUs) in a multi-user multiple-input and multiple-output (MU-MIMO) communication system. The transmitter device may include a communication circuit coupled to a processing circuit. The communication circuit adapted for communicating with a plurality of receiver devices. The processing circuit may be configured to assemble for transmission a plurality of concurrent data streams within a first transmission window, each concurrent data stream including one or more MPDUs and is associated with a different recipient, the first transmission window having a first length. As a result, the processing circuit may receive, from the plurality of receiver devices, an indication of a retransmission subset of the MPDUs to be retransmitted for at least one of the concurrent data streams. Consequently, the processing circuit may assemble for transmission the plurality of concurrent data streams within a second transmission window, the at least one of the concurrent data streams in the second transmission window including the retransmission subset of the MPDUs and one or more new MPDUs so that a total length of each of the plurality of concurrent data streams in the second transmission window is equal to the first length. The processing circuit may be further configured to obtain an indication that at least one packet of at least one of the retransmission subsets includes an error from transmitting the second plurality of concurrent data streams within the second transmission window indicating a need to retransmit at least one MPDU again. The processing circuit may consequently retransmit the plurality of concurrent data streams within a third transmission window, at least one concurrent data stream in the third transmission window including the at least one MPDU and one or more new MPDUs so that a total length of each of the plurality of concurrent data streams in the third transmission window is equal to the first length.

A first method operational in a receiver device is provided to facilitate retransmission of Media Access Control (MAC) protocol data units (MPDUs) in a multi-user multiple-input and multiple-output (MU-MIMO) communication system. A first data stream may be received within a first transmission window including a first number of MPDUs, the first transmission window having a first length and a plurality of concurrent data streams associated with different recipients.

The receiver device may then determine which MPDUs in the first data stream are successfully received and which MPDUs are received with errors. An acknowledgment may then be sent (by the receiver device) indicating each MPDU in the first data stream that is received with errors. As a result, the receiver device may receive the first data stream within a second transmission window including a second number of retransmitted MPDUs, the second transmission window having a second length equal to or less than the first length and including one or more retransmitted MPDUs for at least one of the concurrent data streams, the second length is equal to a longest of the retransmitted MPDUs within the concurrent data streams. The receiver device may determine that the second number of MPDUs includes one or more retransmitted MPDUs that were previously determined to have been received with errors. Likewise, the receiver device may also determine that the second number of MPDUs includes one or more new MPDUs. The MPDUs for each concurrent data stream may be encapsulated within a Physical (PHY) protocol data unit (PPDU). In one example, each of the concurrent data streams in the first transmission window may carry a first PPDU of the first length and each of the concurrent data streams in the second transmission window may carry a second PPDU of the second length, where the second length is less than the first length. In another example, the first transmission window may carry a first Physical (PHY) protocol data unit (PPDU) in a first data stream, the first PPDU having MPDUs with a maximum packet index, the second transmission window may carry a second PPDU in the first data stream, and any new MPDUs added to the second PPDU has an index exceeding the maximum packet index. In some instances, the second length of the second transmission window may be equal to or less than the first length of the first transmission window. In some implementations, at least one data stream in the concurrent data streams has MPDUs of a first duration and another data stream in the concurrent data streams has MPDUs of a second duration. In some instances, at least two data streams in the concurrent data streams may have different data rates.

Similarly, a receiver device may be provided that facilitates retransmission of Media Access Control (MAC) protocol data units (MPDUs) in a multi-user multiple-input and multiple-output (MU-MIMO) communication system. The receiver device may include a communication circuit coupled to a processing circuit. The communication circuit may be configured to communicate with a transmitter device. The processing circuit may be configured to receive a first data stream within a first transmission window including a first number of MPDUs, the first transmission window having a first length and a plurality of concurrent data streams associated with different recipients. The processing circuit may determine which MPDUs in the first data stream are successfully received and which MPDUs are received with errors. An acknowledgment may then be transmitted by the receiver device indicating each MPDU in the first data stream that is received with errors. Consequently, the receiver device may receive the first data stream within a second transmission window including a second number of retransmitted MPDUs, the second transmission window having a second length equal to or less than the first length and including one or more retransmitted MPDUs for at least one of the concurrent data streams, the second length is equal to a longest of the retransmitted MPDUs within the concurrent data streams.

The processing circuit may be further adapted to: (a) determine that the second plurality of MPDUs includes one or more retransmitted MPDUs that were previously determined to have been received with errors; and/or (b) determine that the second number of MPDUs includes one or more new MPDUs.

A second method operational in a receiver device is provided to facilitate retransmission of Media Access Control (MAC) protocol data units (MPDUs) in a multi-user multiple-input and multiple-output (MU-MIMO) communication system. A first data stream may be received within a first transmission window including a first number of MPDUs, the first transmission window having a first length and a plurality of concurrent data streams associated with different recipients. The receiver device may determine which MPDUs in the first data stream are successfully received and which MPDUs are received with errors. As a result, an acknowledgment may be sent indicating each MPDU in the first data stream that is received with errors. Consequently, the first data stream may be received within a second transmission window, for each concurrent transmission stream the second transmission window including one or more retransmitted MPDUs and/or one or more new MPDUs so that a total length of each of the plurality of concurrent data streams in the second transmission window is equal to the first length. The received device may then (a) determine that the first data stream within the second transmission window includes one or more retransmitted MPDUs that were previously determined to have been received with errors, and/or (b) determine that the first data stream within the second transmission window includes one or more new MPDUs. In one implementation, the first number of MPDUs may be buffered in a receive buffer that is longer than the first length. The first number of MPDUs may be removed (from the buffer) according to a sequence order.

Buffer space in the receive buffer may be released for the retransmitted MPDUs responsive to determining that the first data stream in the second transmission window includes one or more retransmitted MPDUs and the one or more retransmitted MPDUs are successfully received. As a result, the one or more new MPDUs may be buffered in the released buffer space. MPDUs for each concurrent data stream may be encapsulated within a Physical (PHY) protocol data unit (PPDU). Each of the concurrent data streams in the first transmission window may carry a first PPDU of the first length and each of the concurrent data streams in the second transmission window carries a second PPDU of the first length.

The first transmission window may carry a first Physical (PHY) protocol data unit (PPDU) in the first data stream, the first PPDU having MPDUs with a maximum packet index, the second transmission window may carry a second PPDU in the first data stream, and any new MPDUs added to the second PPDU has an index exceeding the maximum packet index.

At least the first data stream in the concurrent data streams may have MPDUs of a first duration and a second data stream in the concurrent data streams may have MPDUs of a second duration.

Similarly, a receiver device may be provided to facilitate retransmission of Media Access Control (MAC) protocol data units (MPDUs) in a multi-user multiple-input and multiple-output (MU-MIMO) communication system. The receiver device may include a communication interface coupled to a processing circuit. The communication interface may be adapted to communicate with a transmitter device. The processing circuit may be configured receive a first data stream within a first transmission window including a first number of MPDUs, the first transmission window having a first length and a plurality of concurrent data streams associated with different recipients. The processing circuit may then determine which MPDUs in the first data stream are successfully received and which MPDUs are received with errors. As a result, the processing circuit may send an acknowledgment indicating each MPDU in the first data stream that is received with errors. Consequently, the processing circuit may receive the first data stream within a second transmission window, for each concurrent transmission stream the second transmission window including one or more retransmitted MPDUs and/or one or more new MPDUs so that a total length of each of the plurality of concurrent data streams in the second transmission window is equal to the first length. A receive buffer may be adapted to buffer the first number of MPDUs, the receive buffer being longer than the first length. The processing circuit may be further adapted to remove the first number of MPDUs from the receive buffer according to a sequence order.

In one example, the processing circuit is further configured to release buffer space in the receive buffer for the retransmitted MPDUs responsive to determining that the first data stream in the second transmission window includes one or more retransmitted MPDUs and the one or more retransmitted MPDUs are successfully received. The receive buffer may be further adapted to buffer the one or more new MPDUs in the released buffer space.

DRAWINGS

DETAILED DESCRIPTION

In the following description, reference is made to the accompanying drawings in which is shown, by way of illustration, specific embodiments in which the disclosure may be practiced. The embodiments are intended to describe aspects of the disclosure in sufficient detail to enable those skilled in the art to practice the invention. Other embodiments may be utilized and changes may be made to the disclosed embodiments without departing from the scope of the disclosure. The following detailed description is not to be taken in a limiting sense, and the scope of the present invention is defined only by the appended claims.

Overview

Embodiments of the present disclosure include devices, methods, and computer readable medium for improved efficiency in MIMO communications that include retransmission protocols.

Techniques are presented herein that allow for multiple retransmission policies for different Media Access Control Protocol Data Units (MPDUs) that include a stream of data (e.g., general data as well as video, and audio streams) to be transmitted from a transmitter to a receiver. For example, one feature provides for a method operational to improve transmission efficiency by reducing a window size of a retransmission window or modifying how retransmission packets are processed to allow for more new packets to be transmitted along with retransmission packets.

Exemplary Network Environment

Figure 1:
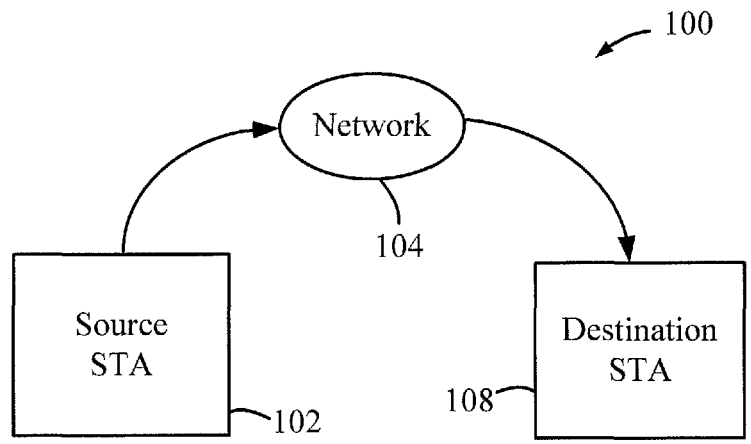
FIG. 1 is a block diagram of one example of a Wireless Local Area Network (WLAN) environment where a source station transmits data to a destination station through one or more networks or a peer-to-peer link.

FIG. 1 illustrates an exemplary WLAN environment 100 where a source STA 102 transmits data to a destination STA 108, which may occur through one or more networks 104 or a direct peer-to-peer link (not shown). In some embodiments, the source STA 102 and/or the destination STA 108 may wirelessly connect via the network 104 (e.g., via one or more access points). In other embodiments, many access points or no access points and/or one or more intermediate networks may exist between the source STA 102 and the destination STA 108.

In general, each of the source STA 102 and/or the destination STA 108 may include a transmitter and a receiver to provide two-way communications. As a result, when referring to a transmitter device and a receiver device, a person of ordinary skill in the art would understand that both might be embodied in each of the source STA 102 and/or the destination STA 108.

Most wireless communication networks, including WLANs, may be broken down into different sections in order to help conceptualize the inner workings and structure of the network. For example, the Open Systems Interconnection model (OSI model) is a way of sub-dividing a communications system into successively smaller parts often referred to as layers. A "layer" may be defined as a collection of conceptually similar functions that provide services to the layer above it and receives services from the layer below it. Embodiments presented herein for providing retransmission policies for different MPDUs that comprise a stream of data transmitted from a source STA 102 to a destination STA 108 may be implemented and conceptualized within such a scheme.

Figure 2:
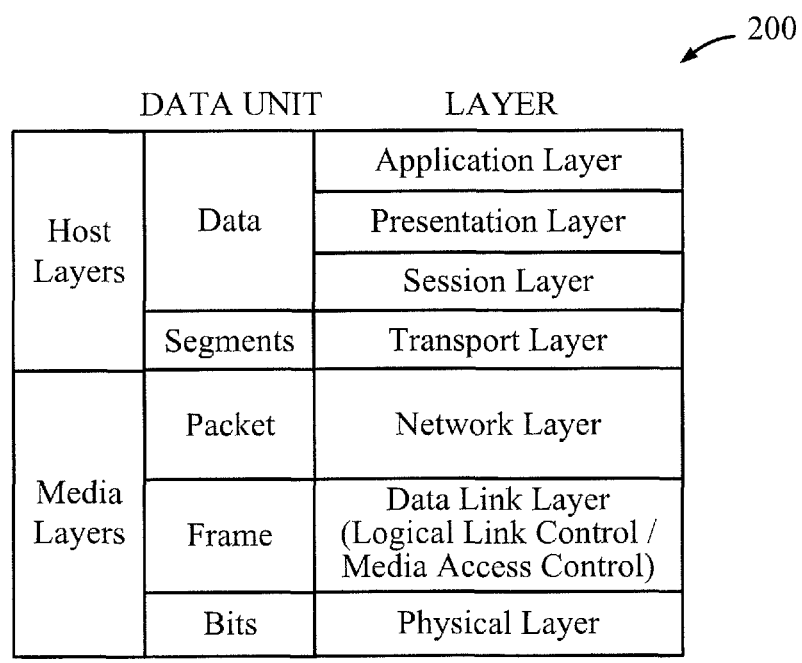
FIG. 2 illustrates an Open System Interconnection (OSI) model that may be implemented as part of a protocol stack used by a device (e.g., transmitter and/or receiver) for communications.

FIG. 2 illustrates an Open System Interconnection (OSI) model that may be implemented as part of a protocol stack used by a device (e.g., transmitter and/or receiver) for communications. In general, content/data from the higher layers of a protocol stack (e.g., host layers) may be encapsulated within the lower layers (e.g., media layers). In one example, the Media Access Control (MAC) Protocol Data Units (MPDUs) may be generated at the Data Link Layer and may encapsulate Application Layer, Presentation Layer, Session Layer, Transport Layer, and/or Network Layer data. As a non-limiting example, embodiments of transmitter devices and receiver devices discussed herein may implement a protocol stack based on this OSI model 200.

A Protocol Data Unit (PDU) describes or includes data and its overhead at a particular layer of a protocol stack. Each layer of a protocol stack may have a unique PDU. At the transmitter device, as data is sent down the protocol stack, it is encapsulated at each layer by adding a header and possibly a trailer. At the receiver device, data is decapsulated as it goes back up the protocol stack. For example, as illustrated in FIG. 2, a transport layer PDU may be referred to as a segment, a network layer PDU may be referred to as packet or datagram, a data link layer PDU may be referred to as a frame, and a physical layer PDU may be referred to as bits.

Figure 3:
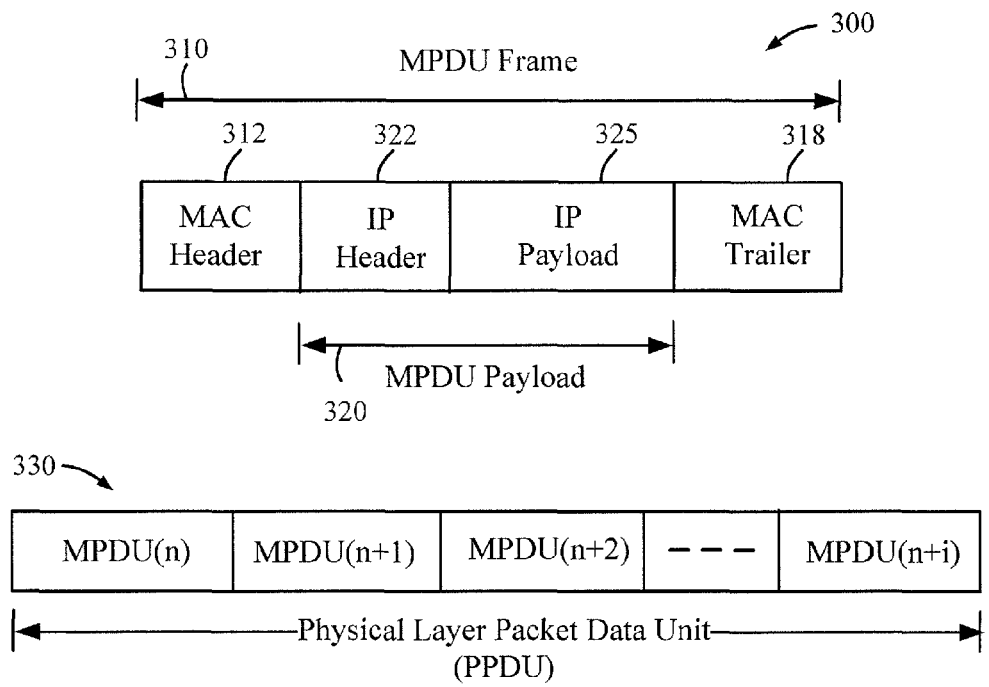
FIG. 3 illustrates a Media Access Control (MAC) Protocol Data Unit (MPDU) including a MAC header and a MAC trailer, with an Internet Protocol (IP) packet serving as the payload for the MPDU according to one embodiment.

FIG. 3 illustrates a Media Access Control (MAC) Protocol Data Unit (MPDU) 300 including a MAC header 312 and a MAC trailer 318, with an Internet Protocol (IP) packet serving as the payload for the MPDU 300 according to one embodiment. An MPDU 300 may be referred to as being within an MPDU frame 310, which includes an MPDU payload 320 encapsulated by the MAC header 312 and the MAC trailer 318. The MPDU payload 320 may include an IP payload 325 encapsulated with an IP header 322.

A Physical (PHY) Protocol Data Unit (PPDU) may include a plurality of MPDUs (e.g., each like MPDU 300) that may be sequentially identified by an index (e.g., n, n+1, n+2, . . . n+i). That is, in order to correctly reconstruct content in the payload portion of a plurality of MPDUs, the sequence in which MPDUs are removed from a receiver buffer (queue) is important. In some receiver systems, MPDUs must be removed (e.g., sent up stream for further processing) in sequential order (e.g., according to their indices and/or only when the packets in a PPDU are complete). If a first MPDU is received with errors (e.g., or errors that do not permit recovery of the first MPDU with error correcting codes), then the subsequent MPDUs (e.g., MPDUs of higher indices within the same PPDU) cannot be removed from a receive buffer until such first MPDU is successfully retransmitted. Thus, retransmission schemes are needed that permit efficiently retransmitting MPDUs while maximizing MPDU throughput and/or minimizing dead air transmissions.

Exemplary Transmitter Device

Figure 4:
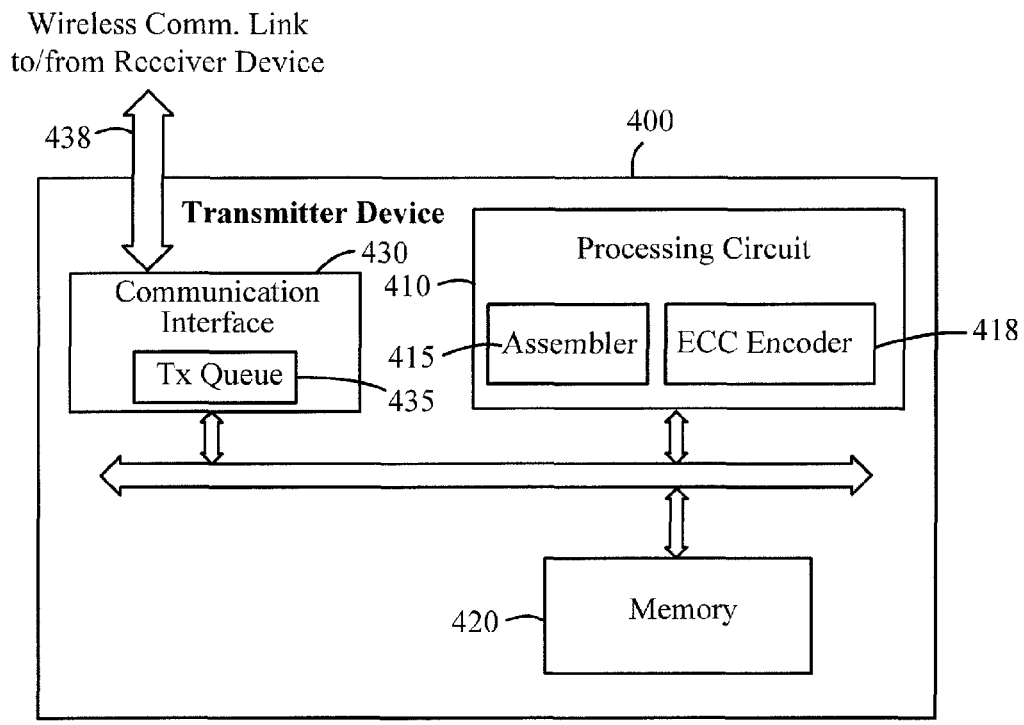
FIG. 4 is a block diagram of an exemplary transmitter device according to an embodiment of the disclosure.

FIG. 4 is a block diagram of an exemplary transmitter device 400 according to one embodiment of the disclosure. The transmitter device 400 may include a processing circuit (e.g., a processor, processing module, etc.) 410, a memory 420, and a communication interface 430. The processing circuit 410 may be communicatively coupled to the memory 420 and communication interface 430 to transmit and/or receive data to/from a receiver device over a wireless communication link 438. In one example, the communication interface 430 may comprise a transmitter circuit and/or receiver circuit (e.g., a transceiver or modem device) adapted or configured for wireless communications with a receiver device. For example, the communication interface 430 may comprise a transmitter circuit, including one or more components of a transmitter chain, to transmit data from the transmit queue 435.

In one example, the processing circuit 410 may include, among other modules, an assembler 415 that may control assembly of MPDUs 300 into multiple data streams for transmission in a MIMO environment, as is explained more fully below.

The communication interface 430 may implement a transmission queue 435 for collecting data prior to transmission. According to one implementation, the transmitter device 400 may be configured to transmit the multiple data streams to multiple receiver devices over the communication interface 430 in a MIMO environment.

In one example, the processing circuit 410 may include an Error Correction Coding (ECC) encoder 418 for encoding error correction codes and appending error correction to packets that are transmitted as discussed more fully below.

Exemplary Receiver Device

Figure 5:
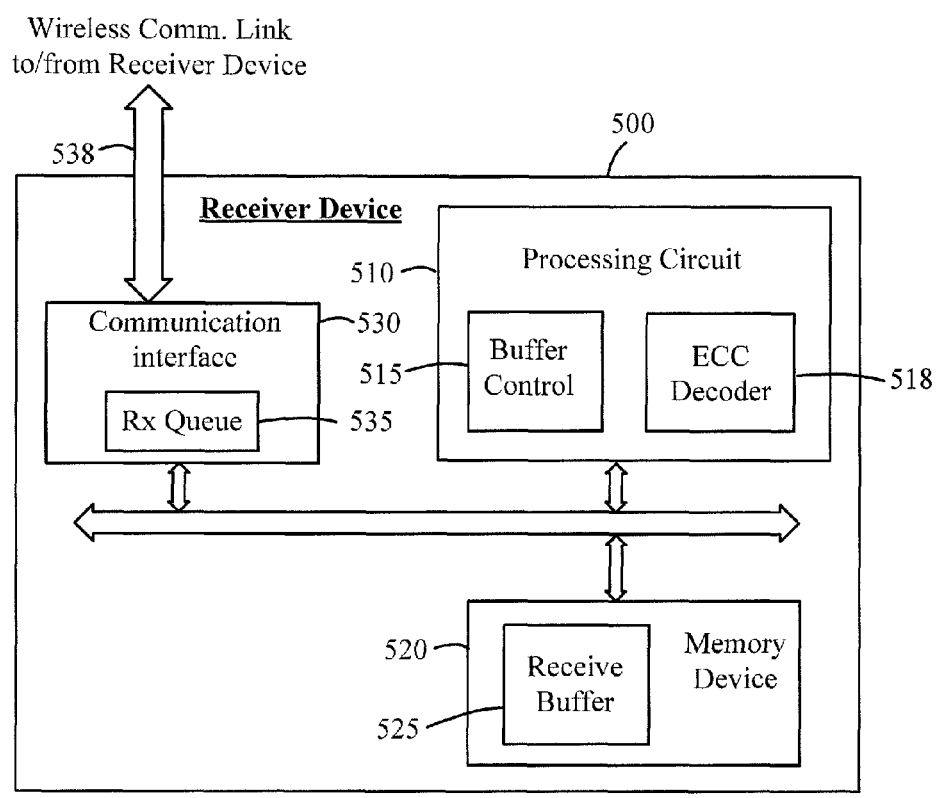
FIG. 5 is a block diagram of an exemplary receiver device according to an embodiment of the disclosure.

FIG. 5 is a block diagram of an exemplary receiver device 500 according to one embodiment of the disclosure.

The receiver device 500 may include a processing circuit (e.g., a processor, processing module, etc.) 510, a memory 520, and a communication interface 530. The processing circuit 510 may be communicatively coupled to the memory 520 and communication interface 530 to transmit and/or receive data to/from a transmitter device 400 (FIG. 4) over a wireless communication link 538. In one example, the communication interface 530 may include a transmitter circuit and/or receiver circuit (e.g., a transceiver or modem device) adapted or configured for wireless communications with a transmitter device. For example, the communication interface 530 may include a receiver circuit, including one or more components of a receiver chain, to receive data and store it in the receive queue 535.

The memory 520 may include a receive buffer 525 for collecting MPDUs 300 as they are received and holding them until all MPDUs 300 for the PPDU are successfully received prior to passing them to a higher level in the communication architecture.

In one example, the processing circuit 510 may include, among other modules, a buffer control module 515 that may control the receive buffer 525 and the collection of the MPDUs 300.

The communication interface 530 may implement a receive queue 535 for collecting data as it is received prior to moving the data to the memory 520 or the processing circuit 510. According to one implementation, the receiver devices 500 may be configured to recognize transmissions including multiple data streams in a MIMO environment and determine which data stream of the multiple data streams is intended for that specific receiver device 500.

In one example, the processing circuit 510 may include an ECC decoder 518 for decoding error correction codes and applying error correction to packets that are received as discussed more fully below.

Exemplary Retransmission Environment

In some communication protocols, MPDUs may be packed within a window (may also be referred to as a "slot") to form a PHY Protocol Data Unit (PPDU). As a non-limiting example for the purposes of discussion herein, the PPDU may include eight (8) MPDUs. An MPDU may be generically referred to as a data unit and/or transmission unit.

In many communication protocols a transmitter device 400 (FIG. 4) communicates with a single receiver device 500 (FIG. 5). These types of communications are often referred to as unicast communications. In other communication protocols, a transmitter device 400 may communicate with multiple receiver devices 500, but transmit the same information to all of the receiver devices. These types of communications are often referred to as multicast communications. MIMO environments allow communications that are even more robust by enabling a transmitter device 400 to send different information to each of multiple receiver devices 500. These types of communications may be referred to herein as simulcast communications.

As a non-limiting example to transmit multiple data channels, the MIMO environment may use spatial multiplexing wherein the signal is split into multiple data streams that may be transmitted at a different phase, different frequency, or combination thereof within the same carrier frequency. A receiver device may be configured to recognize these different spatial signatures and extract the data stream that is intended for it.

Figure 6:
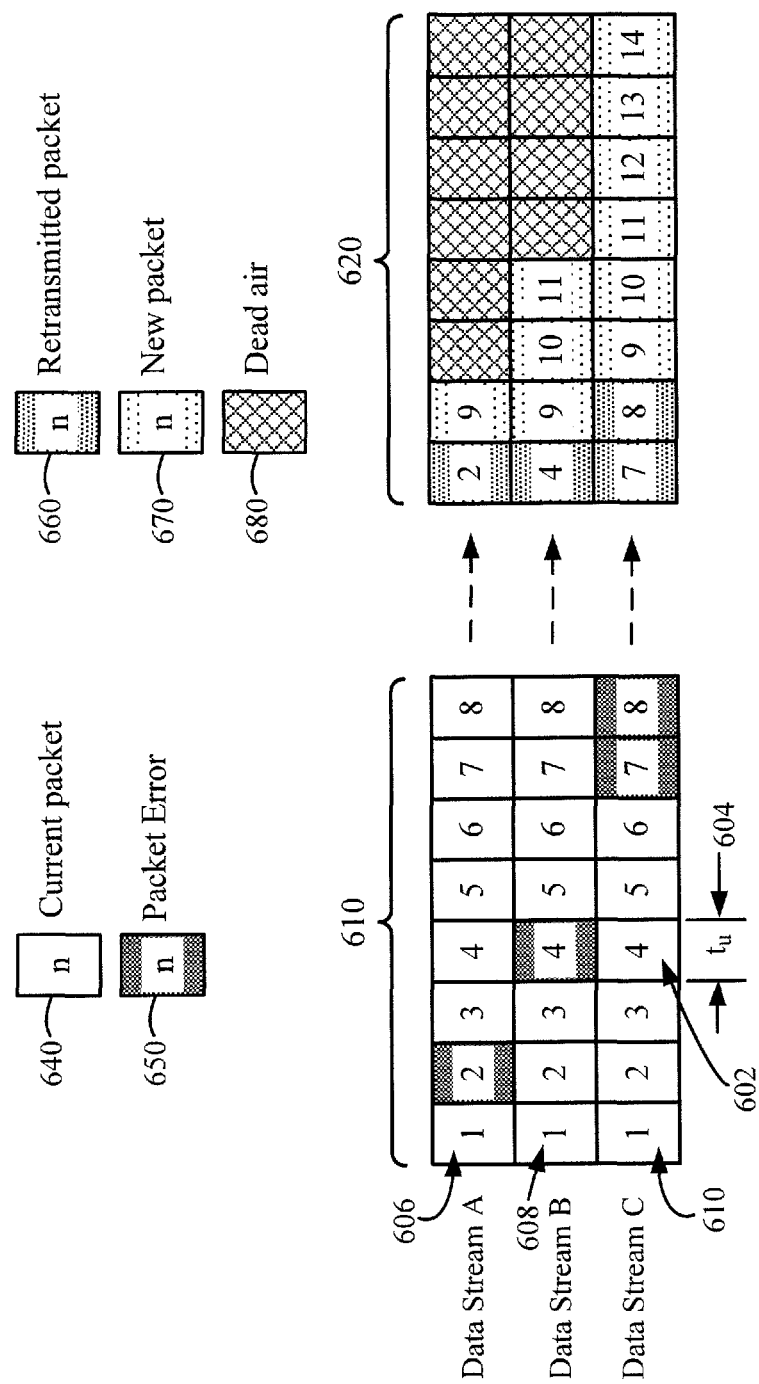
FIG. 6 illustrates retransmission in accordance with one embodiment.

FIG. 6 illustrates retransmission in accordance with one embodiment. In this example, eight (8) MPDUs may be transmitted within a PPDU to three different stations (STA-1, STA-2, and STA-3) or destinations within a transmission window using a MIMO approach. In one embodiment, a first transmission window 610 includes transmissions (e.g., data streams) for the three different stations (STA-1, STA-2, and STA-3) as illustrated by packets 1-8 for each data stream. A single packet 602 (e.g., MPDU) may also be referred as a data unit or transmission unit. Each packet 602 or unit may have a time duration $t_u$ 604. It should be noted that the numbers 1-8 are used to designate a packet order within the first transmission window 610, not to designate information within the packet. In addition, each packet in each data stream may include different information. In other words, packet 1 606 in data stream A (for station STA-1) is transmitted concurrently with a packet 1 608 in data stream B (for station STA-2) and a packet 1 610 in data stream C (for station STA-3), but each of the packets 1 606, 608, and 610 may include different information and may be destined for different receiver devices.

At the receiver devices 500, the receive buffers 525 of each receiver device 500 may collect its corresponding set of the MPDU packets. In some communication protocols, a restriction on processing MPDU packets (e.g., within the same PPDU) may be that the packets be removed in sequence (e.g., according to MPDU indices) from the receive buffer 525. Thus, if a transmission error occurs for packet n, then subsequent packets n+1, n+2, etc., within the same transmission window (or PPDU) cannot be removed from the receive buffer 525 until packet n is successfully retransmitted. More generally, the receive buffer at a receiver device may not flush MPDUs n+1, n+2, . . . , (e.g., in the same PPDU) until MPDU n has been received without errors. The efficiency of a transmission system may be negatively impacted if the receive buffer length is short (e.g., buffer length is equal to transmission window length) since there may not be sufficient space to receive additional MPDUs without first releasing the pending MPDUs.

In FIG. 6 the packets are illustrated with different shading to indicate status of the packets. A current packet 640 that is successfully received is represented with no shading. A current packet that includes a packet error 650 is represented with a dark stipple shading. A retransmitted packet 660 is represented with a medium stipple shading. A new packet 670 within a second transmission window 620 is represented with a light stipple shading. A dead air packet 680 (i.e., a possible location for a packet with no data transmitted therein) is represented with a diamond shading.

Thus, as shown in the first transmission window 610, MPDU packet 2 destined for STA-1 includes a packet error 650. Similarly, MPDU packet 4 destined for STA-2 includes a packet error 650. Finally, MPDU packets 7 and 8 destined for STA-3 include packet errors 650. These indications of packet status are also used in FIGS. 7-9.

In some embodiments, a packet error 650 may be indicated by no acknowledgement (ACK) being sent from the receiver devices 500 to the transmitter device 400 within a defined time frame. In other embodiments, a packet error 650 may be indicated by a negative acknowledgement (NACK) indicating that a packet includes an error being sent from the receiver devices 500 to the transmitter device 400 within a defined time frame.

In some protocols, as a result of the receive errors in the first transmission window 610, a second PPDU in a second transmission window 620 with the same size (i.e., same number of packets) is sent. As shown in the second transmission window 620, erroneous packet 2 for STA-1 is resent as a retransmitted packet 660, erroneous packet 4 for STA-2 is resent as a retransmitted packet 660, and erroneous packets 7 and 8 for STA-3 are resent as retransmitted packets 660. The protocol may attempt to send new packets 670 with the retransmitted packets 660 in the second transmission window. However, due to the windowing environment, there may be limits on how many new packets may be sent. That is, transmission windows are often sized to fit within the buffer length of receivers. If such receive buffer is already partially occupied by packets (i.e., MPDUs) that were not flushed/released due to a lower-indexed packet having errors, then the number of new packets that may be added to the second transmission window is limited. Adding more packets to the second transmission window than there is space available to buffer them at the receive buffer is pointless.

In the case of STA-1, only one new packet (packet 9) may be sent with the retransmitted packet 2 since the receive buffer 525 still has packets 3-8. That is, the receive buffer 525 was only able to remove packet 1 since packet 2 had errors. So, at most, the receiving buffer for STA-1 has room for packet 2 and one new packet (packet 9).

Similarly, for STA-2, packet 4 had errors in the first PPDU transmission and MPDU packet 4 is therefore retransmitted in a subsequent second PPDU along with three new MPDU packets (packets 9-11). Three new packets 670 are possible because the original MPDU packets 1, 2, and 3 were successfully received and can be removed from the receiving buffer 525 of STA-2, freeing space for the new MPDU packets 9, 10, and 11.

Likewise, for STA-3, packets 7 and 8 had errors in the first transmission window 610 and are retransmitted in the second transmission window 620. Because original MPDU packets 1-6 were successfully/correctly received, new packets 9-14 can be appended to the retransmitted packets 7 and 8.

The groups of packets to be retransmitted may be referred to herein as a retransmission subset. Thus for station STA-1 the retransmission subset includes packet 2, for station STA-2 the retransmission subset includes packet 4, and for station STA-3 the retransmission subset includes packets 7 and 8.

It should be noted that the second transmission window 620 illustrated in FIG. 6 reflects the restriction imposed by certain protocols that received packets should be removed in sequence from the receive buffer. Thus, this retransmission scheme retransmits just enough packets per data stream as will fit in the receive buffer.

Figure 13:
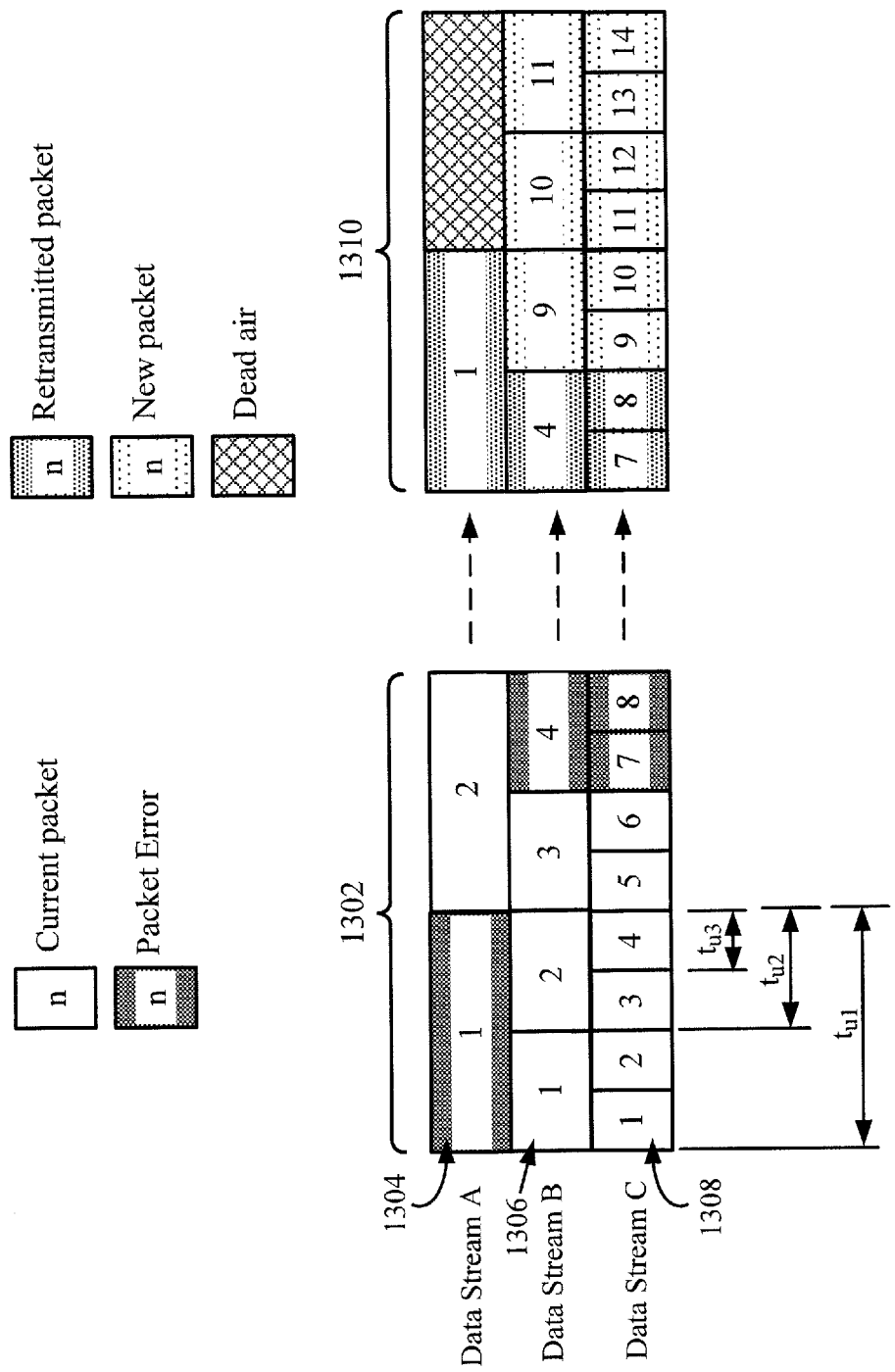
FIG. 13 illustrates another example of how multiple data streams may be accommodated and retransmitted within a transmission window.

FIG. 13 illustrates another example of how multiple data streams may be accommodated and retransmitted within a transmission window. In this example, a first transmission window 1302 may include a plurality of data streams, where two or more of the data streams may have different transmission rates (e.g., packets or units in different streams may have different durations $t_{u1}$, $t_{u2}$, and $t_{u3}$). For example, a first data stream A may include packets 1304 of a first duration $t_{u1}$ a second data stream B may include packets 1306 of a second duration $t_{u2}$, and a third data stream C may include packets 1308 of a third duration $t_{u3}$. A second transmission window 1310 may serve to retransmit packets which had transmission errors in the first transmission window 1302. For example, packet 1 of the first data stream A is retransmitted in the second transmission window 1310, packet 4 of the second data stream B is retransmitted in the second transmission window 1310, and packets 7 and 8 of the third data stream C are retransmitted in the second transmission window 1310. This figure illustrates that data streams of different rates and/or packet duration may be transmitted within each transmission and/or retransmission window.

With the transmission protocol illustrated in FIGS. 6 and 13, depending on which MPDU packet in the sequence is retransmitted, a significant amount of padding (i.e., dead air) may be added to the PPDU carrying the retransmitted MPDU packets. As can be seen from FIGS. 6 and 13, a significant number of dead air packets 680 in the second transmission window 620, which may be considered wasted air time because the receive buffer 525 cannot accept additional MPDUs in the second PPDU. This leads to lower network throughput efficiency. Therefore, a more efficient retransmission scheme is desirable that can make more efficient use of the available space in a PPDU carrying retransmitted MPDUs.

Exemplary Retransmission Scheme 1

Figure 7:
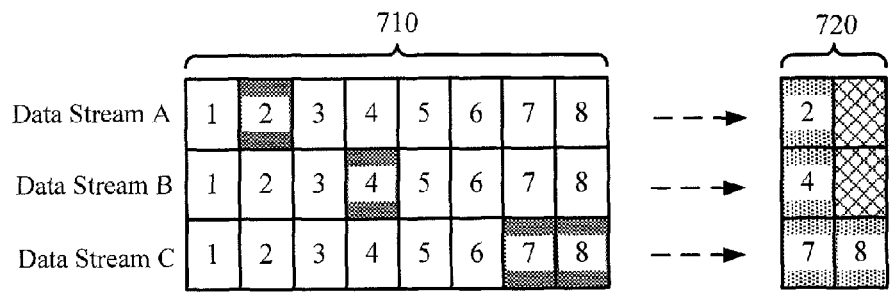
FIG. 7 illustrates a second embodiment of retransmission using a reduced size retransmission window in which only retransmitted MPDUs are sent in a subsequent PPDU.

FIG. 7 illustrates a retransmission scheme with a reduced size retransmission window 720 in which only retransmitted MPDUs are sent in a subsequent PPDU. When one or more MPDUs in a first PPDU in the first transmission window 710 have packet errors 650, only those one or more MPDUs are retransmitted in a second PPDU in the retransmission window 720 (also referred to herein as a second transmission window 720) as retransmitted packets 660. New MPDUs are only sent after all previously transmitted MPDUs are successfully received (e.g., acknowledged). Because the second transmission window 720 is truncated to accommodate only the largest of the retransmission subsets (in this example the subset of packets 7 and 8 for station STA-3), overall bandwidth for retransmission is reduced and there are significantly fewer dead air packets 680. For example, in FIG. 7, only two dead air packets 680 are included as opposed to FIG. 6, where ten dead air packets 680 are included.

However, this approach of FIG. 7 may still result in an inefficient retransmission if one of the packet streams has a large number of retransmitted MPDU packets because the retransmission window 720 size may approach the full size of a normal transmission window (e.g. the first transmission window 710).

Figure 14:
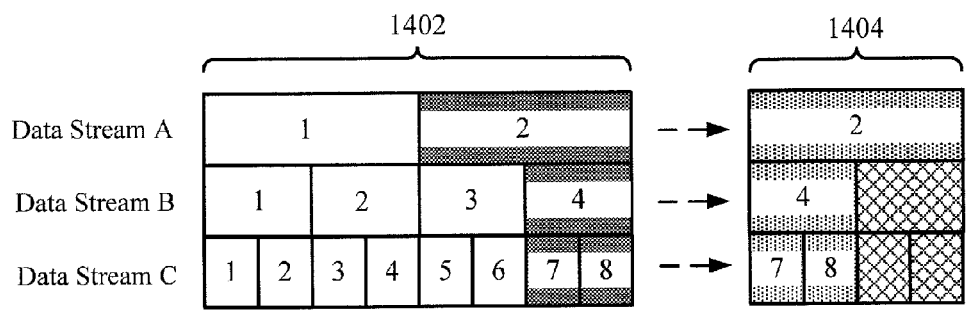
FIG. 14 illustrates a retransmission alternative for data streams of different rates in which a reduced size retransmission window is used.

FIG. 14 illustrates a retransmission scheme for data streams of different rates in which a reduced size retransmission window 1404 is used. A plurality of data streams A, B, and/or C of two or more transmission rates are send in the same first transmission window 1402. However, packet 2 in a first data stream A, packet 4 in a second data stream B, and packets 7 and 8 in a third data stream C have errors during transmission. Here, only the packets or units that had errors in a first transmission window 1402 are retransmitted in a second transmission window 1404, thereby allowing truncation of the second transmission window 1404 to the longest of the retransmitted packets in the plurality of data streams.

Exemplary Retransmission Scheme 2

Figure 8:
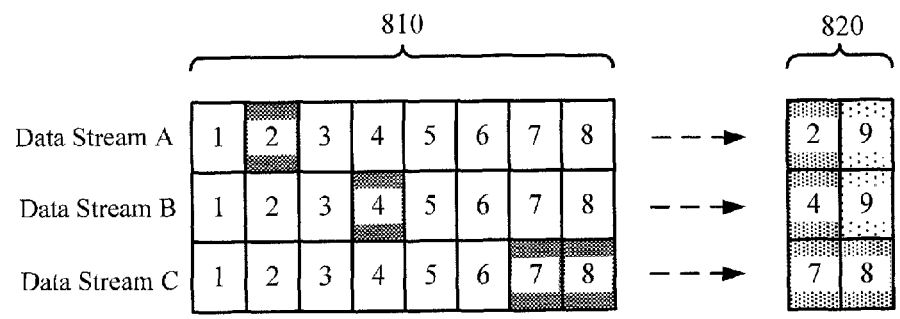
FIG. 8 illustrates another embodiment of retransmission using a reduced size retransmission window in which some new MPDUs are sent with retransmitted MPDUs.

FIG. 8 illustrates another embodiment of retransmission using a reduced size retransmission window 820 in which some new MPDUs are sent with retransmitted MPDUs. As with the embodiment of FIG. 7, when one or more MPDUs in a first PPDU in the first transmission window 810 have packet errors 650, only those one or more MPDUs are retransmitted in a second PPDU in the retransmission window 820 as retransmitted packets 660. Then, extra MPDUs are added as new packets 670 to each stream until no more new packets 670 can be added to any one stream. As with the embodiment of FIG. 7, the second transmission window 820 is still truncated to accommodate only the largest of the retransmission subsets (in this example the subset of packets 7 and 8 for station STA-3). However, data streams with smaller retransmission subsets may include new packets 670 to pad that data stream such that there are no dead air packets 680. Thus, the data stream for station STA-1 can include new packet 9 and the data stream for station STA-2 can include new packet 9. In this scheme, the dead air space in the second transmission window 720 (FIG. 7) is filled with new packets while limiting the second transmission window length 820 to the longest of the retransmission packets. The packet indices for the new packets 670 (e.g., new packet 9) added to the second PPDU in the retransmission window 820 may exceed the indices for the packets in the first PPDU in the first transmission window 810.

Figure 15:
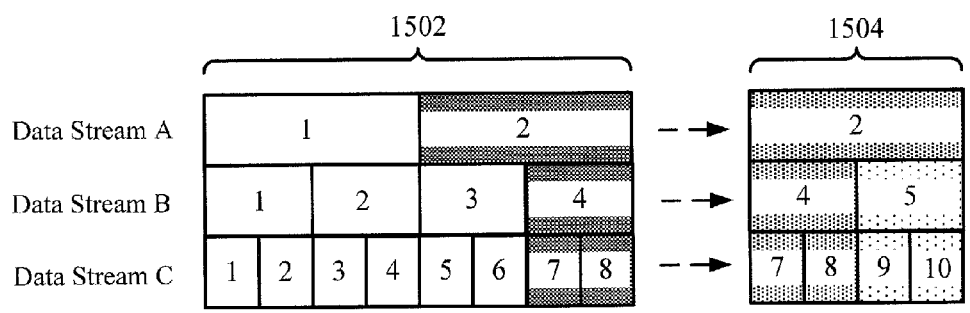
FIG. 15 illustrates a retransmission alternative for data streams of different rates in which a reduced size retransmission window is used and new packets or units may be added to data streams to pack the retransmission window.

FIG. 15 illustrates a retransmission alternative for data streams of different rates in which a reduced size retransmission window 1504 is used and new packets or units are added to data streams to pack to the retransmission window. However, packet 2 in a first data stream A, packet 4 in a second data stream B, and packets 7 and 8 in a third data stream C have errors during transmission. The packets or units that had errors in a first transmission window 1502 are retransmitted in a second transmission window 1504. The length or duration of the second transmission window 1504 may be dictated by the data stream with the most (or longest duration) packet retransmissions. Unused space/slots in the retransmission window 1504 are filled with new packets or units.

Exemplary Retransmission Scheme 3

Figure 9:
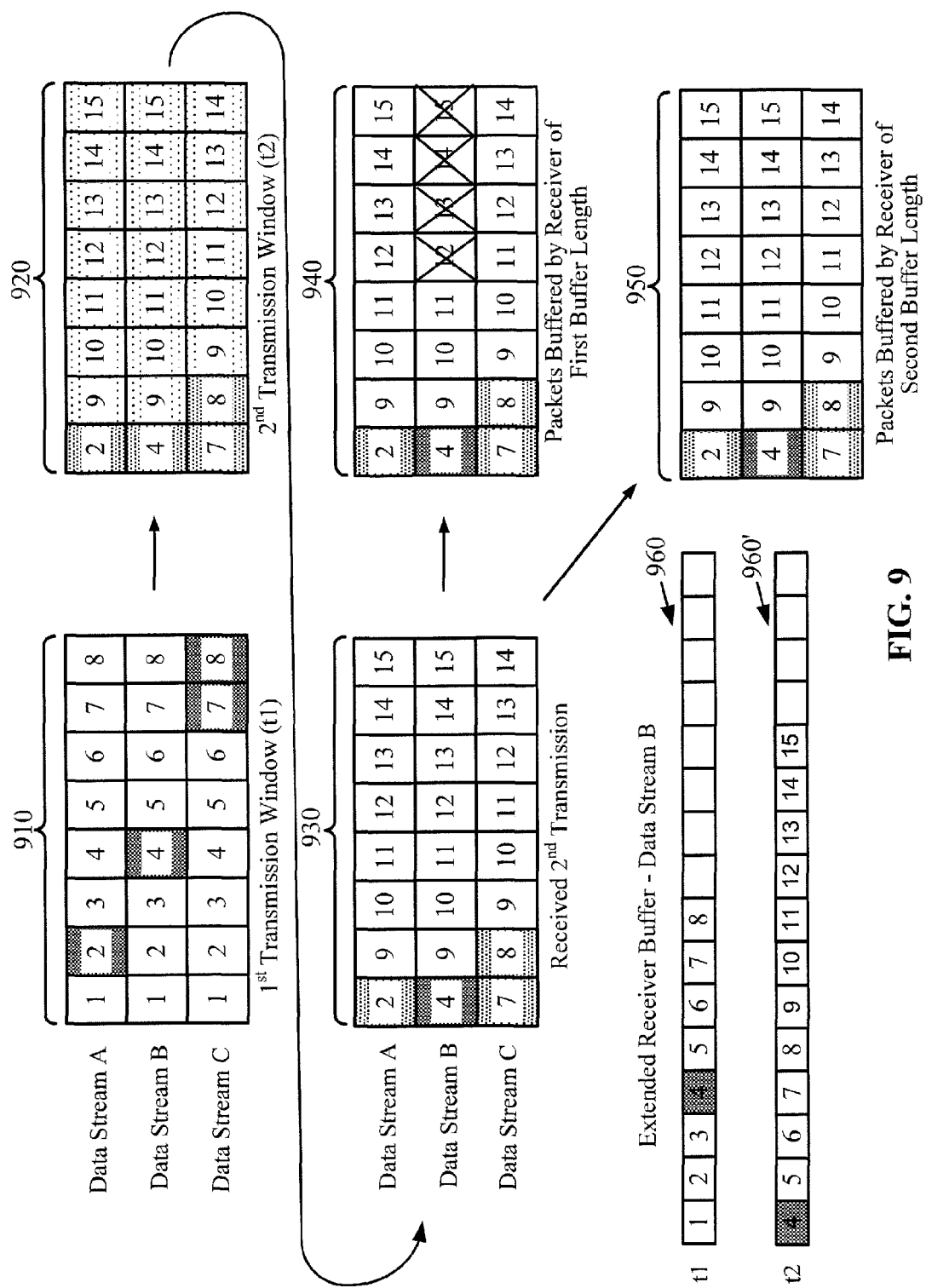
FIG. 9 illustrates yet another embodiment of retransmission using full retransmission windows.

FIG. 9 illustrates yet another retransmission scheme using full retransmission windows. As with FIGS. 6-8, a first transmission window 910 (e.g., a first PPDU) includes packet errors 650 at packet 2 for station STA-1 (data stream A), at packet 4 for station STA-2 (data stream B), and at packets 7 and 8 for station STA-3 (data stream C). The packets with errors are retransmitted as retransmitted packets 660 in a second transmission window 920 (e.g., a second PPDU). However, the transmitter device 400 includes new packets 670 for each data stream to fill out a full second transmission window 920 in the assumption that the receiver devices 500 can handle the new packets 670. The new packets 670 may have packet indices that exceed the packet indices in the first PPDU. Thus, for stations STA-1 and STA-2 new packets 9-15 (in data streams A and B) and for station STA-3 new packets 9-14 (in data stream C) are added to the second PPDU in the second transmission window 920.

If the receiver devices 500 are configured to release space in the receive buffer 525 as soon as a previous PPDU is complete due to the retransmitted packet 660, or include additional space for receiving the new packets 670, then the receive buffer 525 should be able to handle the new packet 670 (which packet indices exceed the indices for the previous PPDU). For example, for STA-1 (data stream A), as soon as retransmitted packet 2 is received, a full PPDU is complete including packets 1 and 3-8 from the first transmission window 910 and retransmitted packet 2 from the second transmission window 920. Thus, as soon as retransmitted packet 2 is successfully received the receive buffer 525 may be released and the PPDU may be sent to the next highest level in the protocol stack. With the receive buffer 525 free, new packets 9-15 may be successfully placed in the receive buffer 525 as they are received.

However, if a retransmitted packet 660 is received again in error, the receiver buffer may not have sufficient space to receive some of the new packets (e.g., packets whose packet indices exceed the packet indices in the previous PPDU). For example, as illustrated by the received second transmission 930, packet for station STA-2 (data stream B), again has errors in the received second PPDU so the receive buffer 525 for station STA-2 cannot release the remaining packets 5-8 (for the first PPDU). As illustrated by window 940, the receive buffer of first length (e.g., 8 packets long) for station STA-2 can only receive new packets 9-11 since packets 1-3 in the first transmission window (e.g., first PPDU) have been previously flushed. That is, packets 12-15 are dropped because the receive buffer 525 for station STA-2 cannot release the space that includes packets 5-7 (in the first transmission window 910 for the first PPDU) until packet 4 is successfully received. The receive buffer keeps the space for the packet 4 available until such packet is received without error in a subsequent retransmission.

To obtain the maximum efficiency from the approach in FIG. 9, the receive buffer 525 may be increased to a second length so that it is larger than a single transmission window of a first length. In this case, all packets received in the second transmission window 930 are buffered as illustrated in window 950. For example, the receive buffer 525 may be twice as long as a single transmission window. For instance, if the transmission window is eight (8) packets long, then the receive buffer may be 12, 16, 20 or 24 packets long. Consequently, rather than dropping packets 12-15, these packets can be queued in the receive buffer 525.

In FIG. 9, it illustrates that an extended receiver buffer is used by a receiver to receive data stream B. The receiver buffer 960 may be sixteen (16) packets long rather than eight (8) packets long. Receiver buffer 960 illustrates the reception and queuing of packets in the first transmission window 910. Meanwhile, receiver buffer 960' illustrates the receipt and queuing of packets in the second transmission window 920. The extended receiver buffer 960/960' permits queuing new packets received in a retransmission window thereby increasing throughput.

Also, as illustrated in FIG. 13-15, the data streams in FIG. 9 may carry packets of different duration or size.

Exemplary Error Correcting Codes at MAC Level

In addition to implementing a modified retransmission approach, the MPDUs may include error correction coding in an attempt to recover packets with errors therein. As a non-limiting example, Raptor codes (i.e., rapid tornado codes) are a class of fountain codes that may be used for error corrections. Raptor codes may encode a given message having a number of symbols k into a potentially limitless sequence of encoding symbols such that knowledge of any k or more encoding symbols allows the message to be recovered with some non-zero probability. The probability that the message can be recovered increases with the number of symbols received above k becoming very close to 1, once the number of received symbols is only very slightly larger than k. A symbol can be any size, from a single byte to hundreds or thousands of bytes.

Figure 10:
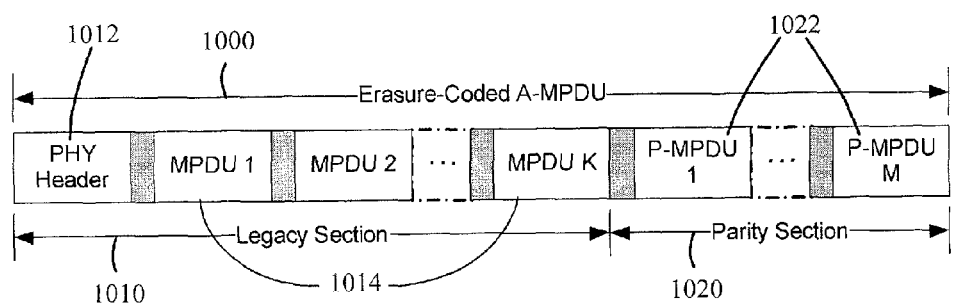
FIG. 10 illustrates one embodiment of error correction coding for an Alternate MPDU (A-MPDU).

FIG. 10 illustrates one embodiment of error correction coding for an Alternate MPDU (A-MPDU) 1000. A legacy section 1010 includes a transmission as discussed above with a PHY header 1012 and MPDUs 1 through K 1014. A parity section 1020 includes Parity-MPDUs 1022 one through M. Thus there are a total of N=K+M packets in the transmission. If any K packets are received successfully (whether they are legacy packets or parity packets), the original legacy packets can be recovered using the error correction. As a non-limiting example, if a transmission includes 50 legacy packets and 5 parity packets, if the 50 legacy packets are all received correctly, no error correction is needed. However, if 5 or less of all the 55 packets (legacy packets and parity packets) include errors, the original 50 legacy packet can be recovered by applying error correction.

Exemplary Transmit Process

Figure 11:
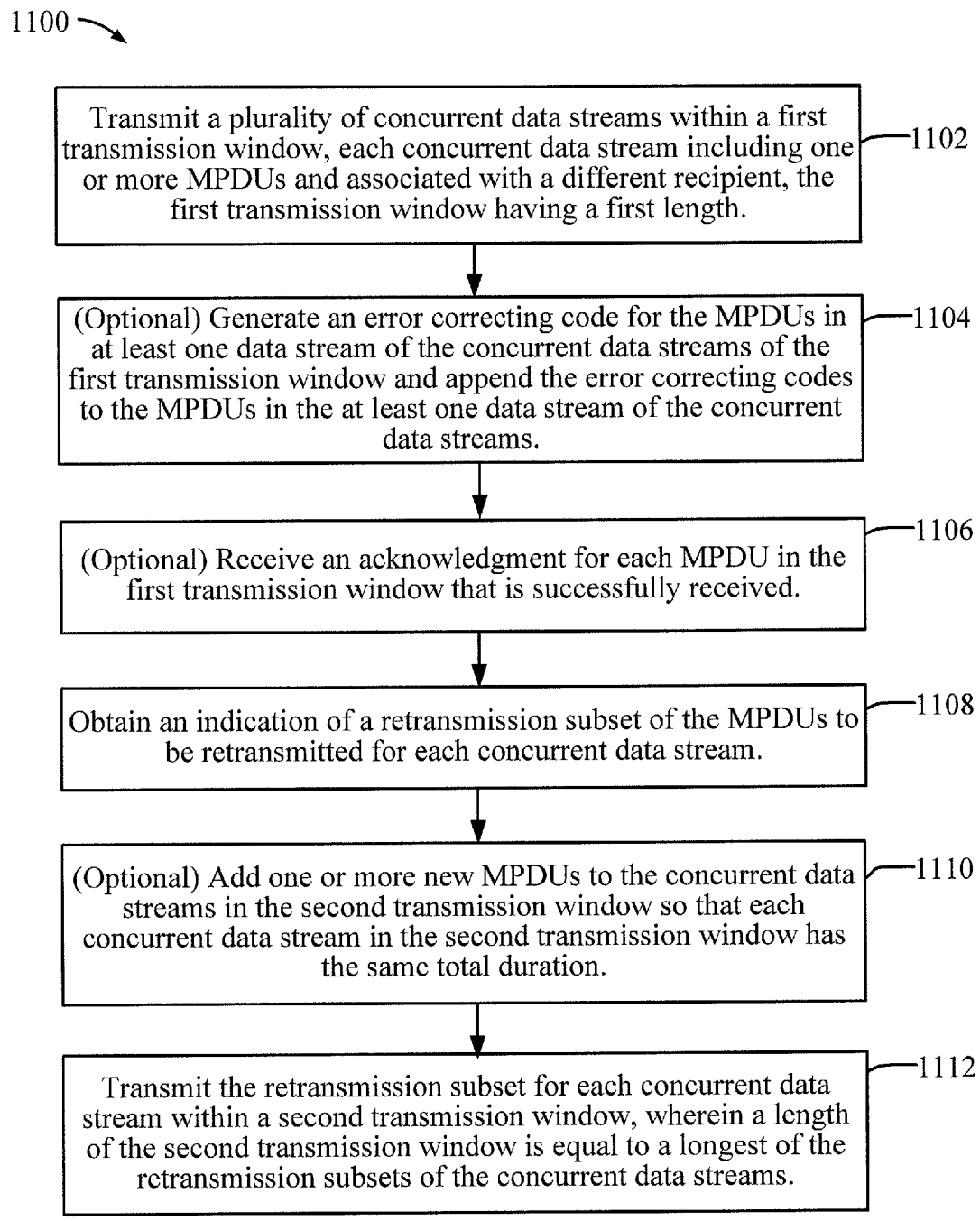
FIG. 11 is a flow diagram illustrating exemplary steps that may be carried out as part of a transmit/retransmit process.

FIG. 11 is a flow diagram illustrating exemplary steps that may be carried out as part of a transmit/retransmit process 1100. This method may be operational at a transmitter device 400 for retransmitting Media Access Control (MAC) protocol data units (MPDUs) in a multi-user multiple-input and multiple-output (MU-MIMO) communication system. Reference also may be made to FIGS. 4-10 and 13-14 when describing the transmit process 1100 of FIG. 11.

In operation block 1102, a plurality of concurrent data streams may be transmitted within a first transmission window, each concurrent data stream including one or more MPDUs and associated with a different recipient, the first transmission window having a first length. For example, transmission windows 710, 810, and 910 may include three data streams sent from the transmitter device 400 to multiple receiver devices 500 as stations STA-1, STA-2, and STA-3. The MPDUs for each concurrent data stream may be encapsulated within a Physical (PHY) protocol data unit (PPDU).

Optionally, operation block 1104 indicates that an error correcting code may be generated for the MPDUs in at least one data stream of the concurrent data streams of the first transmission window and appended to the to the MPDUs in the at least one data stream of the concurrent data streams. Appending the error correcting code may reduce the number of packet errors in the first transmission window and reduce or eliminate the need for retransmission in the second transmission window. Such error correcting codes may permit reconstruction of MPDUs that were otherwise received with errors.

In operation block 1108, an indication of a retransmission subset of the MPDUs to be retransmitted for each concurrent data stream may be obtained by the transmitter device 400. Each of the receiver devices 500 may indicate to the transmitter device 400, which, if any, of the packets within the first transmission window had errors. For example, in operation block 1106, an acknowledgment may be received for each MPDU in the first transmission window that is successfully received. The retransmission subset of the MPDUs to be retransmitted may identify or indicate zero MPDUs (in the case that all packets of a data stream are successfully received) or one or more MPDUs (in the case where one or more MPDU are received with errors or with unrecoverable errors) for each data stream.

Alternatively, each of the receiver devices 500 may indicate to the transmitter device 400, which of the packets within the first transmission window had were received successfully. Therefore, the absence of an acknowledgement (ACK) for a particular MPDU indicates packet errors.

Optionally, operation block 1110 indicates that one or more new MPDUs may be added to the concurrent data streams in the second transmission window so that each concurrent data stream in the second transmission window has the same total duration. Such new MPDUs may be added to each data stream according to the transmission schemes illustrated in FIGS. 6, 7, and/or 8, for example. In one example, the first transmission window carries a first Physical (PHY) protocol data unit (PPDU) in a first data stream, the first PPDU having MPDUs with a maximum packet index, a second transmission window carries a second PPDU in the first data stream, and any new MPDUs added to the second PPDU has an index exceeding the maximum packet index.

In operation block 1112, the retransmission subset for each concurrent data stream is transmitted within the second transmission window, wherein a length (e.g., time duration) of the second transmission window is equal to a longest of the retransmission subsets of the concurrent data streams. Note that the "length" of the retransmission subsets may refer to a time/duration of a particular retransmission subset and/or transmission window. As non-limiting examples, FIGS. 7, 8, 14, and 15 illustrate that the length of second transmission window is limited by the length of the longest retransmission subset. For instance, in FIG. 7, where the transmission units/packets for all data streams are of the same length, the length of the second transmission window 720 (e.g., retransmission window) is data stream C (i.e., the longest retransmission subset) where two units/packets are being retransmitted. In another example, in FIG. 14, where the transmission units/packets for two or more data streams are of different length, the length of the second transmission window 1404 (e.g., retransmission window) is data stream A (i.e., the longest retransmission subset). Even though a single packet is being retransmitted in data stream A, its duration is longer than the packets for other data streams, therefore the length of the second transmission window 1404 is as long as the retransmission subset for data stream A. In one instance, each of the concurrent data streams in the first transmission window carries a first PPDU of the first length and each of the concurrent data streams in the second transmission window carries a second PPDU of a second length, where the second length is less than the first length.

Figure 12:
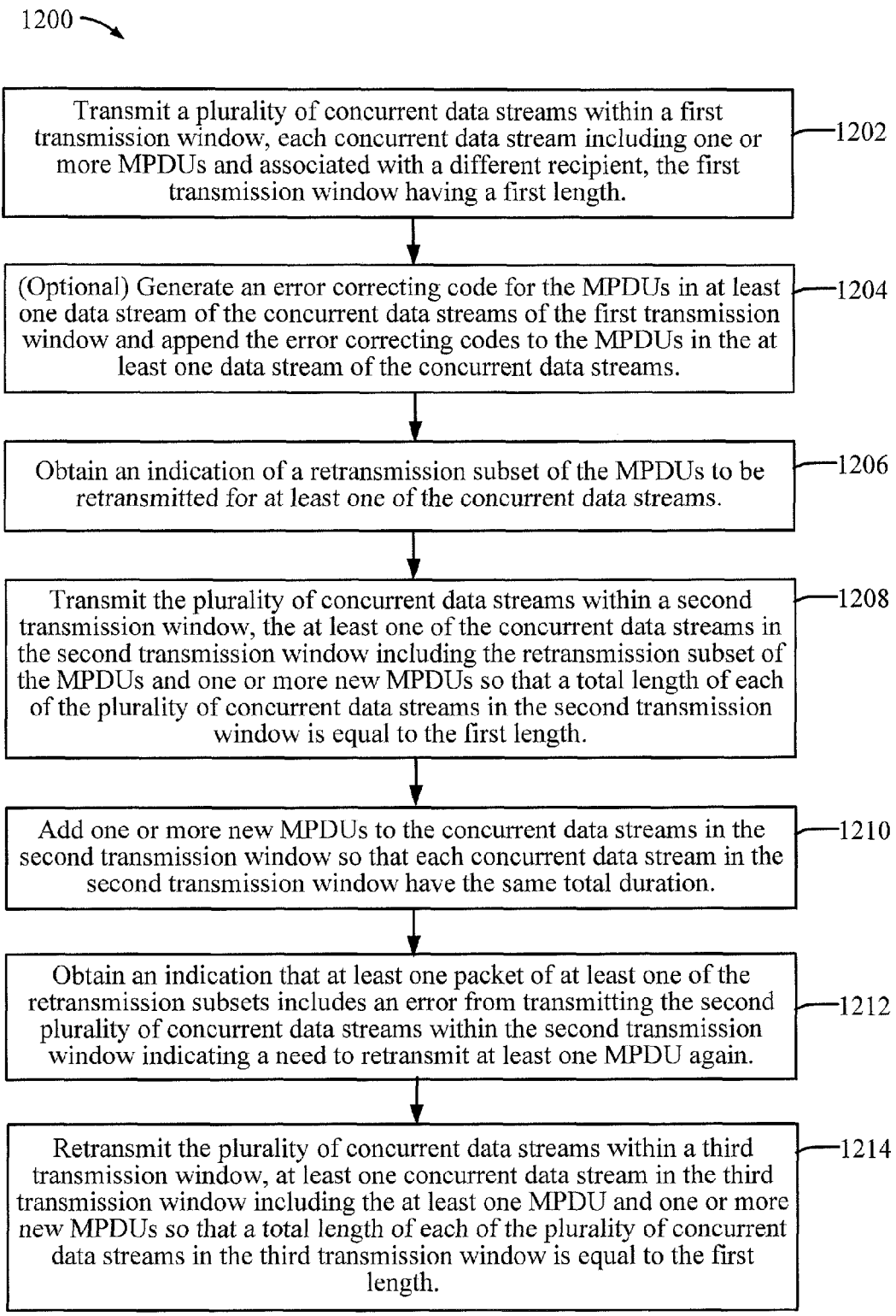
FIG. 12 is a flow diagram illustrating another exemplary steps that may be carried out as part of a transmit/retransmit process.

FIG. 12 is a flow diagram illustrating another exemplary steps that may be carried out as part of a transmit/retransmit process 1200. This method may be operational at a transmitter device for retransmitting Media Access Control (MAC) protocol data units (MPDUs) in a multi-user multiple-input and multiple-output (MU-MIMO) communication system. Reference also may be made to FIGS. 4-10 and 13-14 when describing the transmit process 1100 of FIG. 11. The MPDUs for each concurrent data stream may be encapsulated within a Physical (PHY) protocol data unit (PPDU).

In operation block 1202, a plurality of concurrent data streams may be transmitted within a first transmission window, each concurrent data stream including one or more MPDUs and associated with a different recipient, the first transmission window having a first length. For example, transmission windows 910 may include three data streams sent from the transmitter device 400 to multiple receiver devices 500 as stations STA-1, STA-2, and STA-3.

Optionally, operation block 1204 indicates that an error correcting code may be generated for the MPDUs in at least one data stream of the concurrent data streams of the first transmission window and appended to the to the MPDUs in the at least one data stream of the concurrent data streams. Appending the error correcting code may reduce the number of packet errors in the first transmission window and reduce or eliminate the need for retransmission in the second transmission window. Such error correcting codes may permit to reconstruction of MPDUs that were otherwise received with errors.

In operation block 1206, an indication of a retransmission subset of the MPDUs to be retransmitted for each concurrent data stream may be obtained by the transmitter device 400. The retransmission subset of the MPDUs to be retransmitted may identify or indicate zero MPDUs (in the case that all packets of a data stream are successfully received) or one or more MPDUs (in the case where one or more MPDU are received with errors or with unrecoverable errors) for each data stream. Each of the receiver devices 500 may indicate to the transmitter device 400, which, if any, of the packets within the first transmission window had errors. For example, in operation block 1106, an acknowledgment may be received for each MPDU in the first transmission window that is successfully received.

Alternatively, each of the receiver devices 500 may indicate to the transmitter device 400, which of the packets within the first transmission window had were received successfully. Therefore, the absence of an acknowledgement (ACK) for a particular MPDU indicates that packet errors.

In operation block 1208, the plurality of concurrent data streams are transmitted within a second transmission window, the at least one of the concurrent data streams in the second transmission window including the retransmission subset of the MPDUs and one or more new MPDUs so that a total length of each of the plurality of concurrent data streams in the second transmission window is equal to the first length. Note that the "length" of the retransmission subsets may refer to a time/duration of a particular retransmission subset and/or transmission window. As non-limiting examples, FIG. 9 illustrate that the length of second transmission window 920 is the same as the first transmission window 910. Each of the concurrent data streams in the first transmission window may carry a first PPDU of the first length and each of the concurrent data streams in the second transmission window may carry a second PPDU of the first length. In one example, the first PPDU may have MPDUs with a maximum packet index, and the second PPDU may carry one or more new MPDUs having an index exceeding the maximum packet index.

In operation block 1210, one or more new MPDUs are added to the concurrent data streams in the second transmission window so that each concurrent data stream in the second transmission window have the same total duration. Such new MPDUs may be added to each data stream according to the transmission scheme illustrated in FIG. 9, for example. However, in one example, at least a first data stream in the concurrent data streams has MPDUs of a first duration and a second data stream in the concurrent data streams has MPDUs of a different second duration.

In operation block 1212, an indication is obtained that at least one packet of at least one of the retransmission subsets includes an error from transmitting the second plurality of concurrent data streams within the second transmission window indicating a need to retransmit at least one MPDU again.

In operation block 1214, the plurality of concurrent data streams are transmitted within a third transmission window, at least one concurrent data stream in the third transmission window including the at least one MPDU and one or more new MPDUs so that a total length of each of the plurality of concurrent data streams in the third transmission window is equal to the first length.

Exemplary Receive Process

Figure 16:
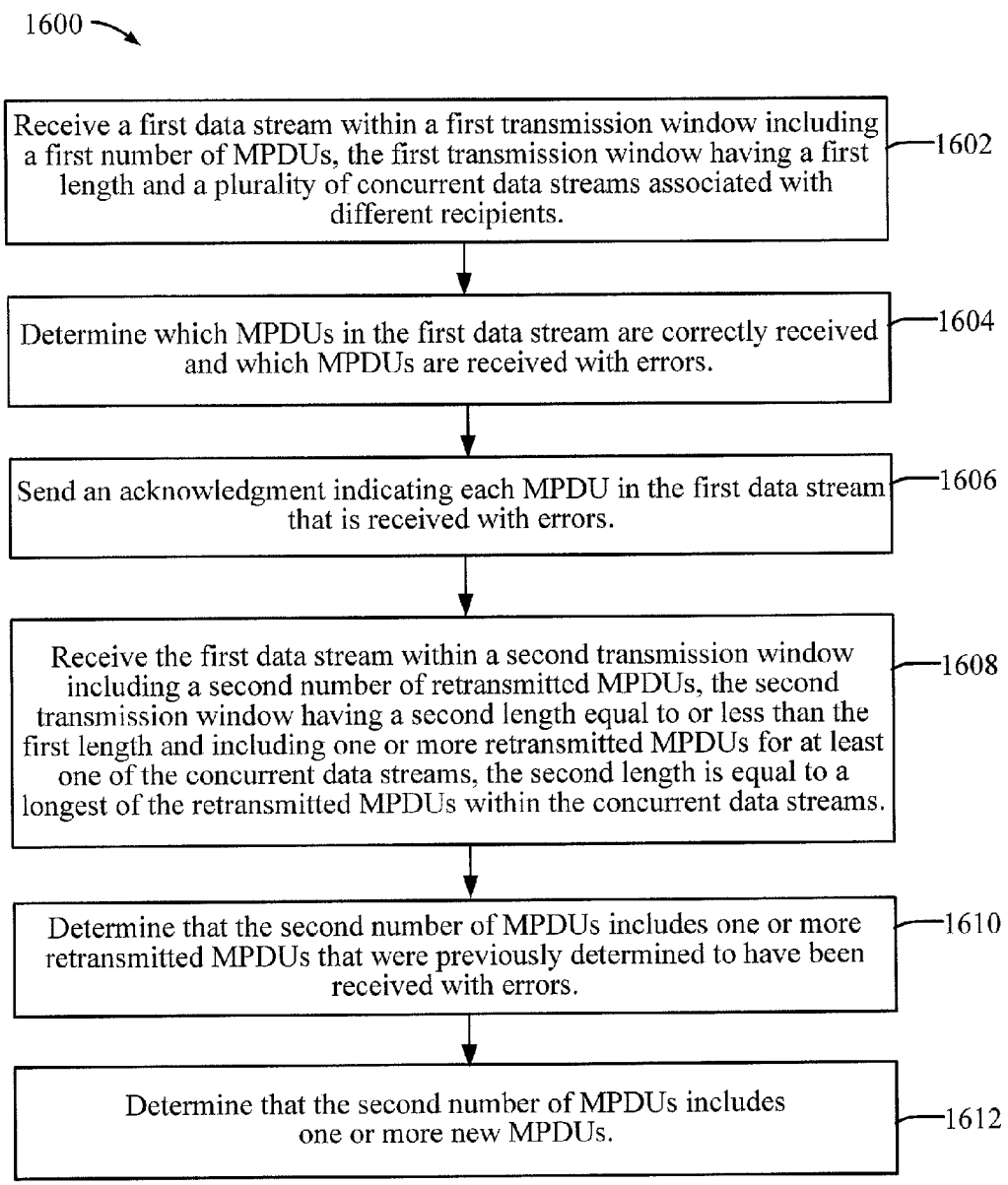
FIG. 16 is a flow diagram illustrating exemplary receive process according to one or more embodiment of the disclosure.

FIG. 16 is a flow diagram illustrating exemplary acts that may be carried out as part of a receive process 1600 according to one or more embodiment of the disclosure. This method may be operational in a receiver to facilitate retransmission of Media Access Control (MAC) protocol data units (MPDUs) in a multi-user multiple-input and multiple-output (MU-MIMO) communication system. Reference also may be made to FIGS. 4-10 and 13-14 when describing the transmit process 1600 of FIG. 16.

Operation block 1602 indicates that a first data stream within a first transmission window is received including a first number of MPDUs, the first transmission window having a first length and a plurality of concurrent data streams associated with different recipients. These concurrent data streams may be transmitted in a MIMO environment and each of the receiver devices 500 would receive the data stream intended for it. The MPDUs for each concurrent data stream may be encapsulated within a Physical (PHY) protocol data unit (PPDU).

Operation block 1604 indicates that a determination is made as to which MPDUs in the first data stream are successfully received and which MPDUs are received with errors (e.g., unrecoverable errors).

Operation block 1606 indicates that an acknowledgment may be sent (to the transmitter device 400) indicating each MPDU in the first data stream that is received with errors.

Operation block 1608 indicates that the first data stream may be received within a second transmission window including a second number of retransmitted MPDUs, the second transmission window having a second length equal to or less than the first length and including one or more retransmitted MPDUs for at least one of the concurrent data streams, the second length is equal to a longest of the retransmitted MPDUs within the concurrent data streams. This operation correlates with exemplary retransmission schemes 1 and 2 discussed above with reference to FIGS. 7, 8, 13 and 14, for example.

Operation block 1610 indicates that a determination may be made as to whether the second number of MPDUs includes one or more retransmitted MPDUs that were previously determined to have been received with errors.

Operation block 1612 indicates that a determination may be made that the second number of MPDUs includes one or more new MPDUs. As a result, this operation may correlate with exemplary retransmission schemes 2 discussed above with reference to FIG. 8. The first transmission window may carry a first Physical (PHY) protocol data unit (PPDU) in a first data stream, the first PPDU having MPDUs with a maximum packet index, the second transmission window may carry a second PPDU in the first data stream, and any new MPDUs added to the second PPDU may have an index exceeding the maximum packet index.

In one example, each of the concurrent data streams in the first transmission window carries a first PPDU of the first length and each of the concurrent data streams in the second transmission window carries a second PPDU of the second length, where the second length is less than the first length.

In one example, the first number of MPDUs may be buffered in a receive buffer 525 and removal of the first number of MPDUs occurs according to a sequence order. The second length of the second transmission window may be equal to or less than a first length of the first transmission window. At least one data stream in the concurrent data streams may have MPDUs of a first duration and another data stream in the concurrent data streams may have MPDUs of a second duration. For instance, at least two data streams in the concurrent data streams have different data rates.

According to another feature, the buffer space in the receive buffer 525 may be released for the retransmitted MPDUs responsive to determining that the second number of MPDUs includes one or more retransmitted MPDUs and the one or more retransmitted MPDUs are successfully received. With the release, one or more of the new MPDUs may be placed in the receive buffer 525 in the released buffer space.

Figure 17:
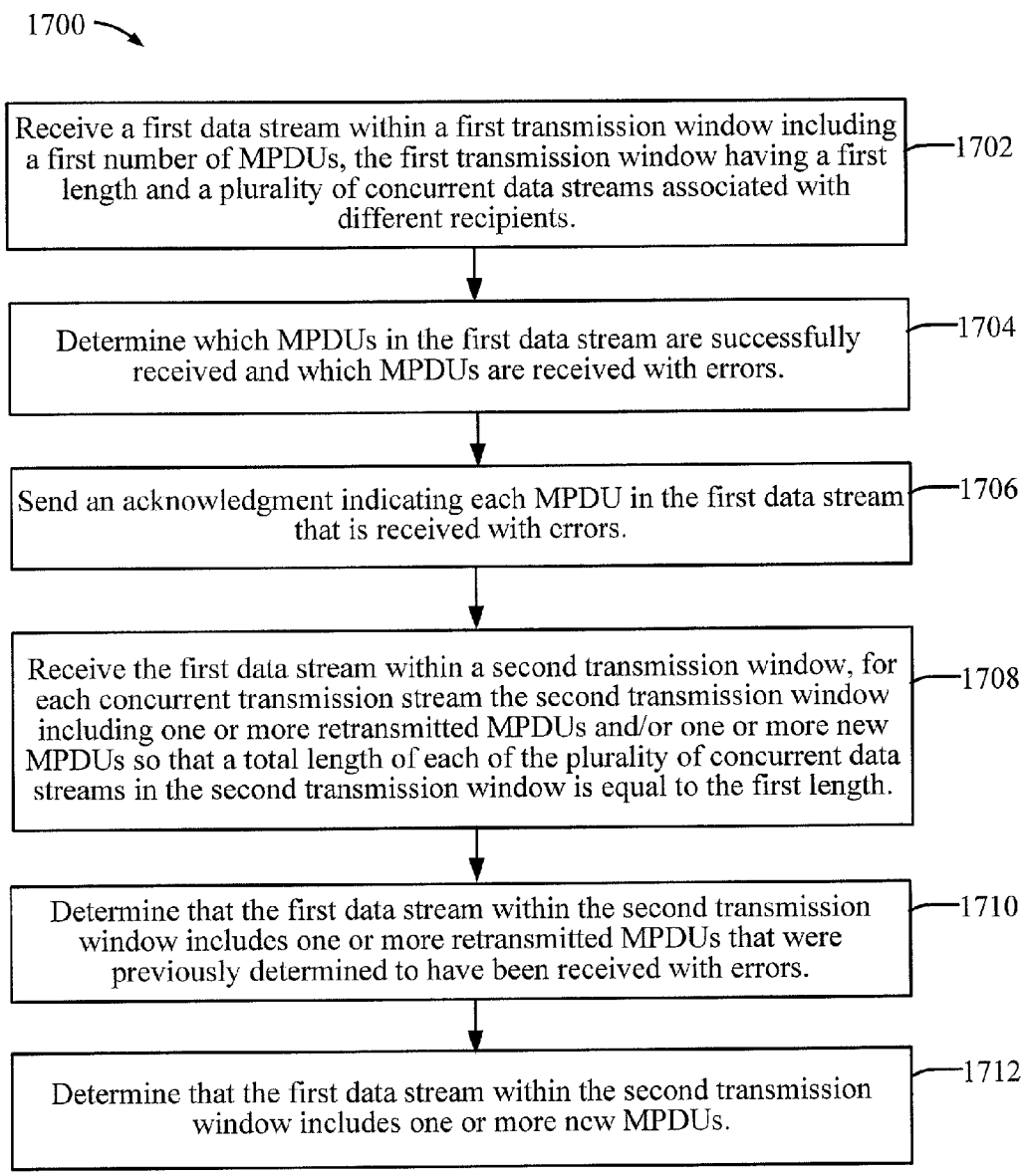
FIG. 17 is a flow diagram illustrating other exemplary steps that may be carried out as part of a receive process according to one or more embodiment of the disclosure.

FIG. 17 is a flow diagram illustrating other exemplary acts that may be carried out as part of a receive process 1700 according to one or more embodiment of the disclosure. This method may be operational in a receiver to facilitate retransmission of Media Access Control (MAC) protocol data units (MPDUs) in a multi-user multiple-input and multiple-output (MU-MIMO) communication system. Reference also may be made to FIGS. 4-10 and 13-14 when describing the transmit process 1700 of FIG. 17. In particular, this method may be implemented as part of the transmission scheme of FIG. 9.

Operation block 1702 indicates that a first data stream may be received within a first transmission window including a first number of MPDUs, the first transmission window having a first length and a plurality of concurrent data streams associated with different recipients. The MPDUs for each concurrent data stream may be encapsulated within a Physical (PHY) protocol data unit (PPDU).

Operation block 1704 indicates that a determination is made as to which MPDUs in the first data stream are successfully received and which MPDUs are received with errors.

Operation block 1706 indicates that an acknowledgment may be sent indicating each MPDU in the first data stream that is received with errors.

Operation block 1708 indicates that the first data stream may be received within a second transmission window, for each concurrent transmission stream the second transmission window including one or more retransmitted MPDUs and/or one or more new MPDUs so that a total length of each of the plurality of concurrent data streams in the second transmission window is equal to the first length. In one example, each of the concurrent data streams in the first transmission window carries a first PPDU of the first length and each of the concurrent data streams in the second transmission window carries a second PPDU of the first length. In another example, the first transmission window may carry a first Physical (PHY) protocol data unit (PPDU) in the first data stream, the first PPDU having MPDUs with a maximum packet index, the second transmission window may carry a second PPDU in the first data stream, and any new MPDUs added to the second PPDU may have an index exceeding the maximum packet index.

Operation block 1710 indicates that a determination may be made that the first data stream within the second transmission window includes one or more retransmitted MPDUs that were previously determined to have been received with errors.

Operation block 1712 indicates that a determination may be made that the first data stream within the second transmission window includes one or more new MPDUs.

According to one aspect, the first number of MPDUs may be buffered in a receive buffer that is longer than the first length and/or the first number of MPDUs may be removed (from the receive buffer) according to a sequence order. Buffer space in the receive buffer may be released for the retransmitted MPDUs responsive to determining that the first data stream in the second transmission window includes one or more retransmitted MPDUs and the one or more retransmitted MPDUs are successfully received. Consequently, the one or more new MPDUs may be buffered in the released buffer space.

According to another aspect, the receive buffer may be longer than the first length of the transmission windows. For example, the receive buffer may be twice or three times as long as the transmission windows, thereby allowing new MPDUs to be buffered even if previous MPDUs are received with errors (e.g., unrecoverable errors).

Specific implementations shown and described are only examples and should not be construed as the only way to implement the present disclosure unless specified otherwise herein. It is readily apparent to one of ordinary skill in the art that the various examples in the present disclosure may be practiced by numerous other partitioning solutions.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software and/or embodied in hardware.

In the description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing embodiments described herein, is considered a special purpose processor for carrying out such embodiments. Similarly, a general-purpose computer is considered a special purpose computer when configured for carrying out embodiments described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a transmitter device for retransmitting Media Access Control (MAC) protocol data units (MPDUs) in a multi-user multiple-input and multiple-output (MU-MIMO) communication system, comprising:
   transmitting a plurality of concurrent data streams within a first transmission window, each concurrent data stream including one or more MPDUs and associated with a different recipient, the first transmission window having a first length;
   obtaining an indication of a retransmission subset of the MPDUs to be retransmitted for each concurrent data stream; and
   transmitting a plurality of concurrent data streams within a second transmission window, wherein the plurality of concurrent data streams of the second transmission window includes the retransmission subset for each concurrent data stream and wherein a length of the second transmission window is equal to a longest duration of the retransmission subset within a single data stream of the concurrent data streams, even when at least one new MPDU is available for transmission in the single data stream corresponding to the retransmission subset having the longest duration.

2. The method of claim 1, wherein the length of the second transmission window is equal to or less than the first length of the first transmission window.

3. The method of claim 1, wherein the MPDUs for each concurrent data stream are encapsulated within a Physical (PHY) protocol data unit (PPDU).

4. The method of claim 3, wherein each of the concurrent data streams in the first transmission window carries a first PPDU of the first length and each of the concurrent data streams in the second transmission window carries a second PPDU of a second length, where the second length is less than the first length.

5. The method of claim 1, further comprising:
   receiving an acknowledgment for each MPDU in the first transmission window that is successfully received;
   wherein the indication of the retransmission subset of the MPDUs to be retransmitted for each concurrent data stream is obtained from a lack of acknowledgments received for the retransmission subset of MPDUs.

6. The method of claim 1, further comprising:
   generating an error correcting code for the MPDUs in at least one data stream of the concurrent data streams of the first transmission window; and
   appending the error correcting codes to the MPDUs in the at least one data stream of the concurrent data streams.

7. The method of claim 1, wherein no new MPDUs are added to the concurrent data streams in the second transmission window thereby making the length of the second transmission window less than the first length.

8. The method of claim 1, further comprising:
   adding one or more new MPDUs to the concurrent data streams in the second transmission window so that each concurrent data stream in the second transmission window has the same duration.

9. The method of claim 8, wherein the first transmission window carries a first Physical (PHY) protocol data unit (PPDU) in a first data stream, the first PPDU having MPDUs with a maximum packet index, the second transmission window carries a second PPDU in the first data stream, and any new MPDUs added to the second PPDU has a packet index exceeding the maximum packet index.

10. The method of claim 1, wherein at least a first data stream in the concurrent data streams has MPDUs of a first duration and a second data stream in the concurrent data streams has MPDUs of a second duration.

11. The method of claim 1, wherein at least two data streams in the concurrent data streams have different data rates.

12. A transmitter device for retransmitting Media Access Control (MAC) protocol data units (MPDUs) in a multi-user multiple-input and multiple-output (MU-MIMO) communication system, comprising:
   a communication interface for communicating with a plurality of receiver devices; and
   a processing circuit coupled to the communication interface, the processing circuit configured to:
   assemble for transmission a plurality of concurrent data streams within a first transmission window, each concurrent data stream including one or more MPDUs and associated with a different receiver device, the first transmission window having a first length;
   receive, from the plurality of receiver devices, an indication of a retransmission subset of the MPDUs to be retransmitted for each concurrent data stream; and
   assemble for transmission a plurality of concurrent data streams within a second transmission window, wherein the plurality of concurrent data streams of the second transmission window includes the retransmission subset for each concurrent data stream and wherein a length of the second transmission window is equal to a longest duration of the retransmission subset within a single data stream of the concurrent data streams, even when at least one new MPDU is available for transmission in the single data stream corresponding to the retransmission subset having the longest duration.

13. The transmitter device of claim 12, wherein the processing circuit is further configured to encapsulate each concurrent data stream within a Physical (PHY) protocol data unit, each of the concurrent data streams in the first transmission window carries a first PPDU of the first length and each of the concurrent data streams in the second transmission window carries a second PPDU of a second length, where the second length is less than the first length.

14. The transmitter device of claim 12, wherein the length of the second transmission window is equal to or less than the first length of the first transmission window.

15. The transmitter device of claim 12, wherein no new MPDUs are added to the concurrent data streams in the second transmission window thereby making the length of the second transmission window less than the first length.

16. The transmitter device of claim 12, wherein the processing circuit is further configured to:
add one or more new MPDUs to the concurrent data streams in the second transmission window so that the concurrent data streams in the second transmission window have the same total duration.

17. The transmitter device of claim 16, wherein the first transmission window carries a first Physical (PHY) protocol data unit (PPDU) in a first data stream, the first PPDU having MPDUs with a maximum packet index, the second transmission window carries a second PPDU in the first data stream, and any new MPDUs added to the second PPDU has a packet index exceeding the maximum packet index.

18. The transmitter device of claim 12, wherein at least a first data stream in the concurrent data streams has MPDUs of a first duration and a second data stream in the concurrent data streams has MPDUs of a second duration.

19. A transmitter device for retransmitting Media Access Control (MAC) protocol data units (MPDUs) in a multi-user multiple-input and multiple-output (MU-MIMO) communication system, comprising:
means for transmitting a plurality of concurrent data streams within a first transmission window, each concurrent data stream including one or more MPDUs and associated with a different recipient, the first transmission window having a first length;
means for obtaining an indication of a retransmission subset of the MPDUs to be retransmitted for each concurrent data stream; and
means for transmitting a plurality of concurrent data streams within a second transmission window, wherein the plurality of concurrent data streams of the second transmission window includes the retransmission subset for each concurrent data stream and wherein a length of the second transmission window is equal to a longest duration of the retransmission subset within a single data stream of the concurrent data streams, even when at least one new MPDU is available for transmission in the single data stream corresponding to the retransmission subset having the longest duration.

20. The transmitter device of claim 19, wherein the MPDUs for each concurrent data stream are encapsulated within a Physical (PHY) protocol data unit.

21. The transmitter device of claim 19, wherein the longest of the retransmission subsets is less than or equal to the first length of the first transmission window.

22. The transmitter device of claim 19, further comprising:
means for generating an error correcting code for the MPDUs in at least one data stream of the concurrent data streams of the first transmission window; and
means for appending the error correcting codes to the MPDUs in the at least one data stream of the concurrent data streams.

23. The transmitter device of claim 19, wherein no new MPDUs are added to the concurrent data streams in the second transmission window thereby making the length of the second transmission window less than the first length.

24. The transmitter device of claim 19, further comprising:
means for adding one or more new MPDUs to the concurrent data streams in the second transmission window so that the concurrent data streams in the second transmission window have the same duration.

25. A non-transitory machine-readable medium having instructions stored thereon, which when executed by a processing circuit causes the processing circuit to:
transmit a plurality of concurrent data streams within a first transmission window, each concurrent data stream including one or more Media Access Control (MAC) protocol data units (MPDUs) and associated with a different recipient, the first transmission window having a first length;
obtain an indication of a retransmission subset of the MPDUs to be retransmitted for each concurrent data stream; and
transmit a plurality of concurrent data streams within a second transmission window, wherein the plurality of concurrent data streams of the second transmission window includes the retransmission subset for each concurrent data stream and wherein a length of the second transmission window is equal to a longest duration of the retransmission subset within a single data stream of the concurrent data streams, even when at least one new MPDU is available for transmission in the single data stream corresponding to the retransmission subset having the longest duration.

26. The non-transitory machine-readable medium of claim 25, wherein no new MPDUs are added to the concurrent data streams in the second transmission window thereby making the length of the second transmission window less than the first length.

27. The non-transitory machine-readable medium of claim 25, wherein the instructions further causes the processing circuit to:
add one or more new MPDUs to the concurrent data streams in the second transmission window so that each concurrent data stream in the second transmission window have the same total duration.

28. A method operational in a receiver device to facilitate retransmission of Media Access Control (MAC) protocol data units (MPDUs) in a multi-user multiple-input and multiple-output (MU-MIMO) communication system, comprising:
receiving a first data stream within a first transmission window including a first number of MPDUs, the first transmission window having a first length and a plurality of concurrent data streams associated with different recipients;
determining which MPDUs in the first data stream are successfully received and which MPDUs are received with errors;
sending an acknowledgment indicating each MPDU in the first data stream that is received with errors; and
receiving the first data stream within a second transmission window including a second number of retransmitted MPDUs, the second transmission window having a second length equal to or less than the first length, a plurality of concurrent data streams associated with different recipients and including one or more retransmitted MPDUs for at least one of the concurrent data streams, the second length is equal to a longest duration of the retransmitted MPDUs within a single data stream of the concurrent data streams, even when at least one new MPDU is available for transmission in the single data stream corresponding to the retransmission subset having the longest duration.

29. The method of claim 28, further comprising:
  determining that the second number of retransmitted MPDUs includes one or more retransmitted MPDUs that were previously determined to have been received with errors; and
  determining that the second number of retransmitted MPDUs includes one or more new MPDUs.

30. The method of claim 28, wherein the MPDUs for each concurrent data stream are encapsulated within a Physical (PHY) protocol data unit (PPDU).

31. The method of claim 30, wherein each of the concurrent data streams in the first transmission window carries a first PPDU of the first length and each of the concurrent data streams in the second transmission window carries a second PPDU of the second length, where the second length is less than the first length.

32. The method of claim 28, wherein the first transmission window carries a first Physical (PHY) protocol data unit (PPDU) in a first data stream, the first PPDU having MPDUs with a maximum packet index, the second transmission window carries a second PPDU in the first data stream, and any new MPDUs added to the second PPDU has an index exceeding the maximum packet index.

33. The method of claim 28, wherein the second length of the second transmission window is equal to or less than the first length of the first transmission window.

34. The method of claim 28, wherein at least one data stream in the concurrent data streams has MPDUs of a first duration and another data stream in the concurrent data streams has MPDUs of a second duration.

35. The method of claim 28, wherein at least two data streams in the concurrent data streams have different data rates.

36. A receiver device to facilitate retransmission of Media Access Control (MAC) protocol data units (MPDUs) in a multi-user multiple-input and multiple-output (MU-MIMO) communication system, comprising:
  a communication circuit for communicating with a transmitter device; and
  a processing circuit coupled to the communication circuit, the processing circuit configured to:
  receive a first data stream within a first transmission window including a first number of MPDUs, the first transmission window having a first length and a plurality of concurrent data streams associated with different recipients;
  determine which MPDUs in the first data stream are successfully received and which MPDUs are received with errors;
  send an acknowledgment indicating each MPDU in the first data stream that is received with errors; and
  receive the first data stream within a second transmission window including a second number of MPDUs, the second transmission window having a second length equal to or less than the first length, a plurality of concurrent data streams associated with different recipients and including one or more retransmitted MPDUs for at least one of the concurrent data streams, the second length is equal to a longest duration of the retransmitted MPDUs within a single data stream of the concurrent data streams, even when at least one new MPDU is available for transmission in the single data stream corresponding to the retransmission subset having the longest duration.

37. The receiver device of claim 36, wherein the processing circuit is further configured to:
  determine that the second number of MPDUs includes one or more retransmitted MPDUs that were previously determined to have been received with errors; and
  determine that the second number of MPDUs includes one or more new MPDUs.

38. A receiver device to facilitate retransmission of Media Access Control (MAC) protocol data units (MPDUs) in a multi-user multiple-input and multiple-output (MU-MIMO) communication system, comprising:
  means for receiving a first data stream within a first transmission window including a first number of MPDUs, the first transmission window having a first length and a plurality of concurrent data streams associated with different recipients;
  means for determining which MPDUs in the first data stream are successfully received and which MPDUs are received with errors;
  means for sending an acknowledgment indicating each MPDU in the first data stream that is received with errors;
  means for receiving the first data stream within a second transmission window including a second number of MPDUs, the second transmission window having a second length equal to or less than the first length, a plurality of concurrent data streams associated with different recipients and including one or more retransmitted MPDUs for at least one of the concurrent data streams, the second length is equal to a longest duration of the retransmitted MPDUs within a single data stream of the concurrent data streams, even when at least one new MPDU is available for transmission in the single data stream corresponding to the retransmission subset having the longest duration.

39. The receiver device of claim 38, further comprising:
  means for determining that the second number of MPDUs includes one or more retransmitted MPDUs that were previously determined to have been received with errors; and
  means for determining that the second number of MPDUs includes one or more new MPDUs.

40. A non-transitory machine-readable medium having instructions stored thereon, which when executed by a processing circuit causes the processing circuit to:
  receive a first data stream within a first transmission window including a first number of MPDUs, the first transmission window having a first length and a plurality of concurrent data streams associated with different recipients;
  determine which MPDUs in the first data stream are successfully received and which MPDUs are received with errors;
  send an acknowledgment indicating each MPDU in the first data stream that is received with errors;
  receive the first data stream within a second transmission window including a second number of MPDUs, the second transmission window having a second length equal to or less than the first length, a plurality of concurrent data streams associated with different recipients and including one or more retransmitted MPDUs for at least one of the concurrent data streams, the second length is equal to a longest duration of the retransmitted MPDUs within a single data stream of the concurrent data streams, even when at least one new MPDU is available for transmission in the single data stream corresponding to the retransmission subset having the longest duration.

41. The non-transitory machine-readable medium of claim 40, wherein the instructions further causes the processing circuit to:
- determine that the second number of MPDUs includes one or more retransmitted MPDUs that were previously determined to have been received with errors; and
- determine that the second number of MPDUs includes one or more new MPDUs.

\* \* \* \* \*